United States Patent
Meiksin et al.

(10) Patent No.: US 6,370,396 B1
(45) Date of Patent: Apr. 9, 2002

(54) FACILITY-WIDE COMMUNICATION SYSTEM AND METHOD

(75) Inventors: Zvi H. Meiksin; T. Brad Petrus; Robert J. Kilgore, all of Pittsburgh, PA (US)

(73) Assignee: Transtek, Inc., Pittsburgh, PA (US)

( * ) Notice: Subject to any disclaimer, the term of this patent is extended or adjusted under 35 U.S.C. 154(b) by 0 days.

(21) Appl. No.: 09/578,757

(22) Filed: May 25, 2000

Related U.S. Application Data

(60) Provisional application No. 60/135,765, filed on May 25, 1999.

(51) Int. Cl.⁷ ............................................. H04M 11/06
(52) U.S. Cl. ....................... 455/560; 455/557; 455/561
(58) Field of Search ................................ 455/560, 554, 455/557, 561

(56) References Cited

U.S. PATENT DOCUMENTS

| 4,495,386 A | | 1/1985 | Brown et al. | |
|---|---|---|---|---|
| 5,365,590 A | * | 11/1994 | Brame | 380/49 |
| 5,630,204 A | * | 5/1997 | Hylton et al. | 455/3.3 |
| 5,699,354 A | * | 12/1997 | Gulliford et al. | 370/315 |
| 5,905,781 A | * | 5/1999 | McHale et al. | 379/93.14 |

* cited by examiner

*Primary Examiner*—Daniel Hunter
*Assistant Examiner*—Thuan T. Nguyen
(74) *Attorney, Agent, or Firm*—Baker & McKenzie

(57) ABSTRACT

A method and system for communication within an energy-transmission-limited environment. RF transceivers throughout the site are located site-wide such that areas within the site in which communications are desired are within range of at least one of the RF transceivers. At each location RF transceivers are connected to a control unit. The control unit provides power to the transceivers and allows bi-directional communication of audio/voice and/or digital information. The control units may be networked to each other using standard network type category-5 or equivalent cables and may communicate to one another via the network connection. The control units may also be networked via an alternating current powerline by using an alternating current modem. The transceiver of the present invention utilizes single sideband modulators to modulate voice and/or digital signals. The signals are demodulated and filtered at a receiving end of the transceiver. A comb filter attenuates noisy signals with drifting harmonics.

21 Claims, 17 Drawing Sheets

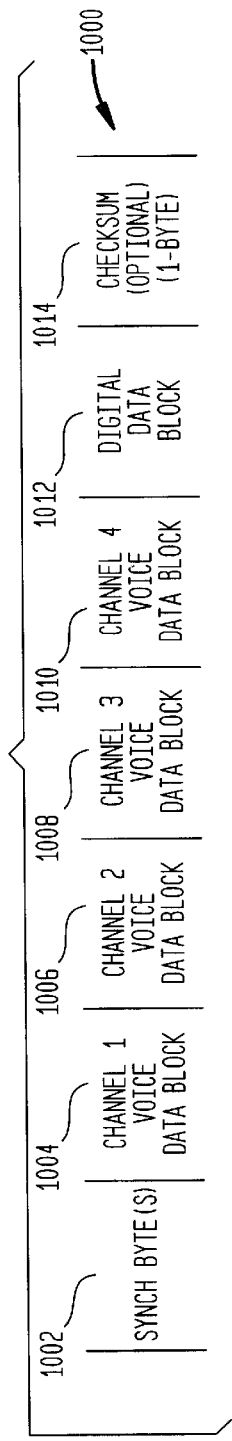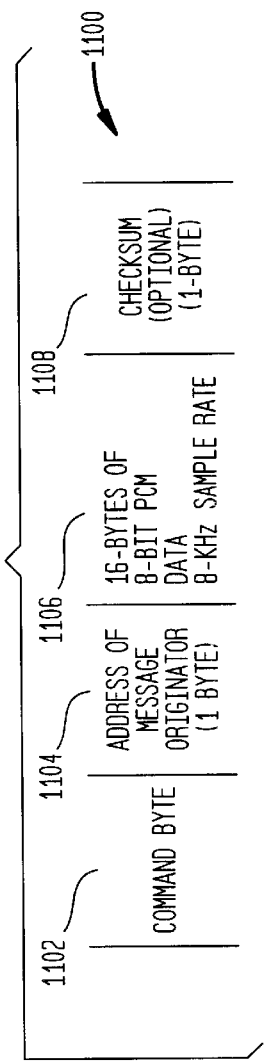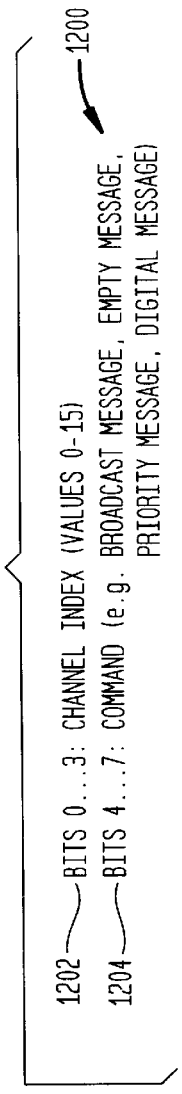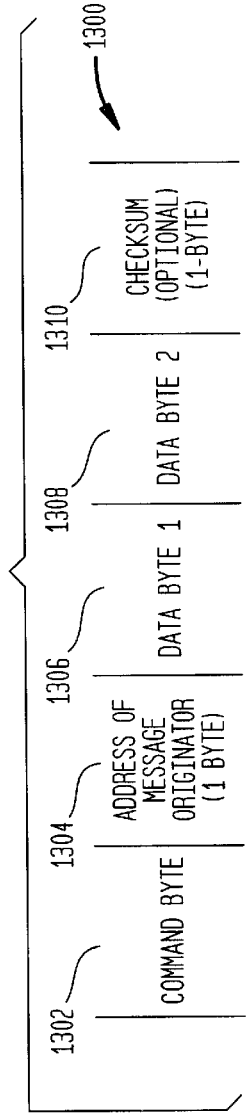

FACILITY-WIDE COMMUNICATION SYSTEM AND METHOD

CROSS-REFERENCE TO RELATED APPLICATIONS

This application claims the benefit of U.S. Provisional Patent Application No. 60/135,765 entitled METHOD AND APPARATUS FOR A MINE COMMUNICATIONS SYSTEM, filed on May 25, 1999.

DESCRIPTION

TECHNICAL FIELD OF THE INVENTION

The present invention relates generally to communication system and method, and more specifically, to a system and method for providing communications where the media limit electromagnetic energy transfers.

BACKGROUND OF THE INVENTION

Traditionally, in environments such as underground mines, industrial structures, and commercial complexes where electromagnetic energy transfer is blocked or limited by the media or obstacles, communication has been achieved by hardwired systems such as telephone lines. The demand for higher workers' safety and for higher productivity stimulated product developments in an effort to use wireless two-way radios. Conventional wireless communication over long distances in these environments is not possible because the mine overburden (earth, water rock, etc.) and steel reinforced concrete in structures attenuate and dissipate the electromagnetic energy before it reaches its destination. Much of the development effort was directed to solve needs specific to the mining industry.

To meet mining communication requirements, it is necessary to have two-way communication between underground workers inside the mine and persons on the surfaces, and two-way communication between workers inside the mine and other workers inside the mine. In the mid 1970's the US Department of the Interior Bureau of Mines (USBM) engaged in efforts to develop wireless communication means for trapped miners. Collins Radio (USBM Contract No. HO133045) and General Instrument (USBM Contract No. JO35017) developed hand-held wireless transmitters that transmitted a tone (i.e., single frequency) that could be used by trapped miners to help surface rescue personnel to locate the trapped miners. Wide band (needed for voice or data) communication was considered impossible because of the amount of energy that would have to be in the transmitting antenna inside the mine that could cause a gas explosion in case of damage to the antenna.

USBM Report #RI9377 discusses and demonstrates the implementation of a method by which a wireless transmitter on the surface using a loop antenna could send a warning signal from the surface into the mine in case of an emergency, but no message could be sent from inside the mine to the surface. The transmitter antenna was fed from a 1 kW amplifier. The receiving antennas inside the mine were made of short high-permeability wound ferrite cores. Transmission from inside the mine to the surface was impossible.

Mine Site Technologies (www.minesite.com.au), and TeleMagnetic Signal Systems (NIOSH Report RI 9641-ISSN 1066–5552), developed one-way communication products to send warning signals to miners based on this USBM report. These systems are only capable of transmitting warning signals into the mine. Voice transmission is impossible in these systems. The signals transmitted from the surface to the interior of the mine cause the miner's cap lamp to flash. In the case of Mine Site Technologies, a warning message is displayed on an LCD. In the case of TeleMagnetic Signal Systems, the flashing lamp is a warning to evacuate the mine. If in addition a red LED is turned on, the miner must go to a telephone to receive the message.

U.S. Pat. No. 4,652,857 discloses a method and apparatus for a non-real time, two-way, wide-band communication for power restricted environments. The invention makes it possible to communicate voice or data from the surface of a mine into the mine, and from inside the mine to the surface. The method requires a loop antenna on the surface and a loop antenna inside the mine. The functioning of the system depends on magnetic Faraday coupling between the two antennas. To keep the antenna current inside the mine small enough to prevent an accidental explosion, the system trades power for bandwidth. This results in non-real time communication from inside the mine to the surface. For example, a six seconds message from inside the mine may take 60 seconds to reconstruct on the surface. Such operation is acceptable for emergency communication, but not for daily operational communication.

Several approaches have been advanced for communications inside a mine. A paper by Dobroski and Stolarczyk in IEEE Trans. on Industry Applications Vol. IA-21 July/August 21, 1985 describes a method for transmission inside a mine using medium frequency. U.S. Pat. Nos. 4,879,755, 5,093,939, and 4,777,652 further teach the application of this concept. The methods taught by these patents depend on residual conductors that happen to be in the mine naturally or from previous structures. Signals "hop" from one conductor to another. Operation in arbitrary mines, therefore, cannot be guaranteed. The medium frequencies require the use of two-way radios that are larger than conventional two-way radios, and antennas that are so large that they must be carried by the miners either as shoulder straps which loop over a person's shoulder or they are sewn into a jacket that must be worn by the miner. Conspec/RIMtech, Raton Technologies, and others built products based on this method.

The most widely used method for wireless communications inside a mine uses so called Leaky feeders or radiating transmission lines. U.S. Pat. Nos. 5,432,838, 5,669,065, 5,697,067, and 5,809,429 discuss application of this method. Such a system makes use of transmission lines (also referred to as feeders or radiax antennas) that consist of coaxial cables with incomplete shielding so that electromagnetic energy is radiated from the cable along the length of the cable that can be received by mobile radios, and the antenna can receive signals transmitted from the mobile radios. The system also has a base station and amplifiers at spaced distances along the transmission lines. The lines are heavy, on the order of ⅝ inch in diameter. They are expensive and expensive to install and maintain. Since energy is gradually disseminated along the line and the total energy is restricted by FCC and safety regulations the energy at any distance from the line is relatively small. The radios between which communication is to be established must be in close proximity to the lines, requiring an extensive cable network throughout the mine. El-equip Inc., Tunnel Radio, Mine Radio Systems and others built products based on this method.

Therefore, it is highly desirable to have a system for providing a two-way bi-directional voice communications as well as digital communications in the environment where electromagnetic energy transfer is blocked or limited.

SUMMARY OF THE INVENTION

The present invention is directed to a method and system for communication, preferably wireless, within an energy-transmission-limited environment such as an underground large industrial facility or mine. In these environments, person-to-person wireless communications are not feasible using traditional communications devices. The present invention enables communications in such an environment using off-the-shelf hand-held radios tuned, for example, within the UHF frequency band. The frequency band is not, however, limited to UHF frequency band. In addition, digital information and control signals such as those acquired by automated sensors can be routed through the facility.

Site-wide communications are enabled by strategically locating RF transceivers throughout the site such that areas within the site in which communications are desired are within range of at least one of the RF transceivers. In the present invention, a plurality of RF transceivers, each one tuned to a frequency, is placed at each location to enable multiple independent channels of communication. The present invention provides, for example, four or more different channels of communication.

At each location, the RF transceivers are connected to a control unit. A control unit, which may be designated as either a master or interface unit, provides power to the transceivers and allows for bi-directional communication of audio or voice, control and status information between the control unit and each transceiver. In this way, the control unit can force the RF transceiver to transmit an audio signal so that anyone within range of the transceiver hears the audio message on their portable hand-held radio. Similarly, when anyone within range of RF transceiver wishes to communicate with another individual, they are enabled to talk into their portable hand-held radio, while pushing the "talk" or "transmit" button, for example. The nearest RF transceiver receives the broadcast and informs the control unit to which the nearest RF transceiver is connected that the transceiver is receiving a valid RF broadcast. The RF transceiver also sends demodulated voice signal to the control unit. In cases where the transmission/reception ranges of the RF transceivers overlap, such that several control units may receive the same RF signal through their corresponding RF transceivers, the control units have the ability to determine the strength of the received signal at the RF transceiver. In this way, only the control unit that is receiving the strongest signal may send the received signal to all other control units in the network. The signal may be digitized.

The control units may be networked to each other using standard network-type Categoy-5 or equivalent cables. In this way, an audio signal, e.g., speech, received by a RF transceiver connected to a control unit is converted from analog signal to digital representation of the signal and sent over the network connections to the other control units connected in the network. When the other control units receive the digitized speech waveform over the network, the control units convert the signal back to analog speech waveform and force the RF transceiver to transmit the signal so that anyone located within range of the transceiver will be able to hear the message on their own hand-held radio. The present invention provides multiple independent channels of communication. These channels of communication may be used to transmit additional information along with the digitized speech signal. The additional information may include digitized speech transmission channel as well as other control information that may be transmitted with the digitized speech waveform.

The control units of the present invention may also include one or more electronic devices such as portable computers, sensors, or automated equipment connected to the control units. The connection may be accomplished by, e.g., using standard RS-232 data communications protocol.

In the present invention, information transferred in the network may be monitored or controlled remotely from within the site. The present invention provides, for example, one RS-232 connection to each control unit.

In one embodiment, each control unit is either designated as a master or an interface unit. In one embodiment, a site includes one control unit designated as the master unit with one or more interface units. The master and interface units may comprise identical electrical hardware. In addition, the master and interface units may include software that controls the units. For example, master unit includes software to control the timing and flow of data over the networked connection.

Additionally, for troubleshooting problems that may occur during installation and maintenance of the system, the control units include several status indicators (LEDs). The status indicators of the present invention may be used to quickly identify network-related errors that may occur over the connection between control units. For example, the status indicators may be used to determine such problems as the existence and location of broken network connections and noise-induced communications errors.

The present invention also includes through-the earth ("TTE") communication system to enable two-way voice as well as digital communication between the surface of the mine and the mine interior. In one embodiment, the TTE system of the present invention need not have a hard-wired connection between the transceiver on the mine surface and the transceiver in the mine interior. The communication in this embodiment may be accomplished by magnetic coupling of energies between the antennas, for e.g., by low frequency n the range of 3,000 Hz and 8,000 Hz between loop antennas connected to TTE transceivers. The transceivers of the present invention in one embodiment utilize single sideband modulators to modulate voice and/or digital signals. The signals are demodulated and filtered at a receiving end of a transceiver. A comb filter attenuates noisy signals with drifting harmonics.

The present invention also includes powerline communication module to provide power to the transceivers and also to enable bi-directional communication of audio/voice, control and status information between the module and one or more transceivers. The powerline communication modules include an alternating current ("AC") power modem capable of connecting to existing AC powerlines. The powerline communication modules may communicate via the AC power modem through existing AC powerlines to other powerline communication modules.

The present invention also includes a novel method of connections between multiple power systems or phases. Traditional system of using a capacitor bridge only to connect multiple power systems does not work reliably when more than two power systems are being connected. Using more than one capacitor bridge in a system, for example, to connect more than two power systems to the same powerline communications network does not work with the traditional systems. To overcome the shortcomings of the traditional systems, the novel bridging method leaves two power systems or phases that are being bridged as independent and galvanically-isolated with only a galvanically-isolated RS-232 serial connection between the two power systems or phases. In this way, network data, e.g., digitized voice and digital process data, may be passed between two powerline communications modules, one on each power system or phase, thereby effectively bypassing the AC powerline medium and instead using a dedicated, galvanically-isolated high-speed serial connection so that the two power systems or phases are left isolated.

Further features and advantages of the present invention as well as the structure and operation of various embodiments of the present invention are described in detail below with reference to the accompanying drawings. In the drawings, like reference numbers indicate identical or functionally similar elements.

BRIEF DESCRIPTION OF THE DRAWINGS

Preferred embodiments of the present invention will now be described, by way of example only, with reference to the accompanying drawings in which:

FIG. 10 illustrates a data block format used for network communications;

FIG. 11 illustrates a channel data block format used in data block format of FIG. 10;

FIG. 12 illustrates a command byte format used in FIG. 11;

FIG. 13 illustrates a digital data block format used in FIG. 10;

DETAILED DESCRIPTION OF THE INVENTION

Facility-wide Communication System

Figure 1:
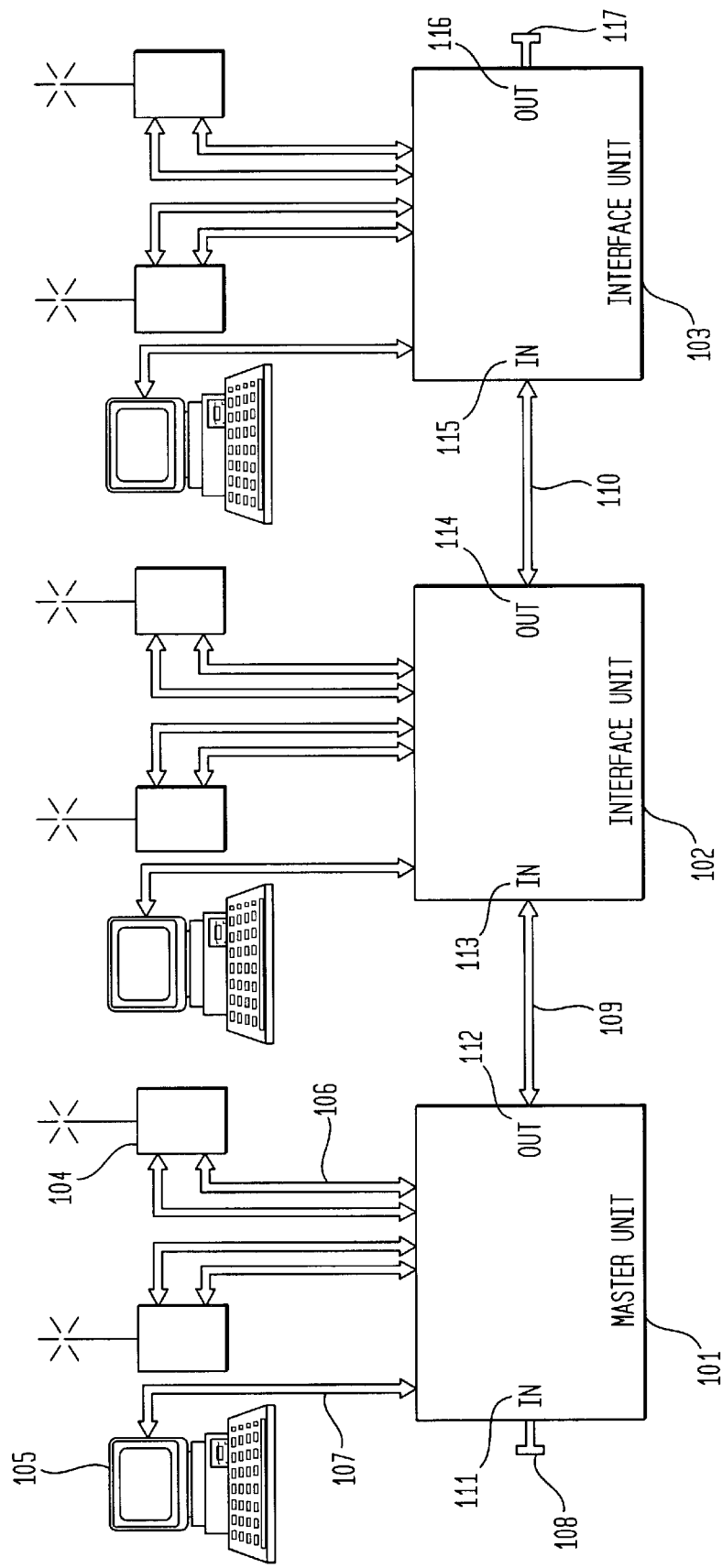
FIG. 1 is a block diagram illustrating the present invention in one embodiment.

FIG. 1 is a block diagram illustrating the present invention in one embodiment. As shown, a master unit 101 is connected to interface units 102, 103. Additional interface units may be connected to the system. The connection between units is made using two pairs of twisted-pair conductors as found in category-5 or equivalent networking cable. The master unit and interface units each have an in-port 111, 113, 115 and an out-port 112, 114, 116 such that digital information is transmitted from the out-port of the master unit 112 to the in-port of interface unit 113 using one pair of twisted-pair cable 109. The interface unit processes the digital information and transmits it through its out-port 114 to the interface unit 103 using one pair of twisted-pair cable 110. Interface unit 103 processes the information and transmits it to its out-port 116. However, since no other interface unit is connected to the out-port of the interface unit 103, a serial data terminator 117 is connected to out-port 116 so that the digital information is returned to interface unit 103. This information is buffered by interface unit 103 and then transmitted from in-port 115 using the second twisted-pair cable 110 to the out-port 114 of interface unit 102. Upon reception of the digital data stream, interface unit 102 buffers the digital data stream and sends it through in-port 113 over the second pair of twisted-pair cable to the out-port 112 of the master unit. The master unit 101, then buffers the data and sends it through in-port 111. If an interface unit was connected to the in-port 111 of the master unit using twisted pair cable, this information would be transmitted to that unit. In this example, however, no interface unit is connected to in-port 111. Instead, a serial data terminator 108 is connected to this port so that the digital data stream is returned to the master unit. In this way, a data stream originating at the master unit 101 is transmitted to each unit in the system. After all units have received the digital data, it is returned to the master unit.

In one embodiment, each interface unit and the master unit may be connected to four RF transceivers 104 with each of the transceivers tuned to a separate RF frequency. Having four transceivers, e.g., enables up to four independent communication channels. The RF transceivers 104 may be connected using twisted pair multi-conductor cable 106. Cable connections other than twisted pair cables may be used. Similarly, the cable may be shielded or unshielded. The length of the cable 106 and the amount of environmental noise may be the factors considered in whether or not to use shielded cables. In the present invention, both power and control signals may be sent to the RF transceivers 104. Additionally, two-pairs of conductors may be used in each cable 106 to send and receive audio signals to and from the RF transceivers 104.

Figure 2:
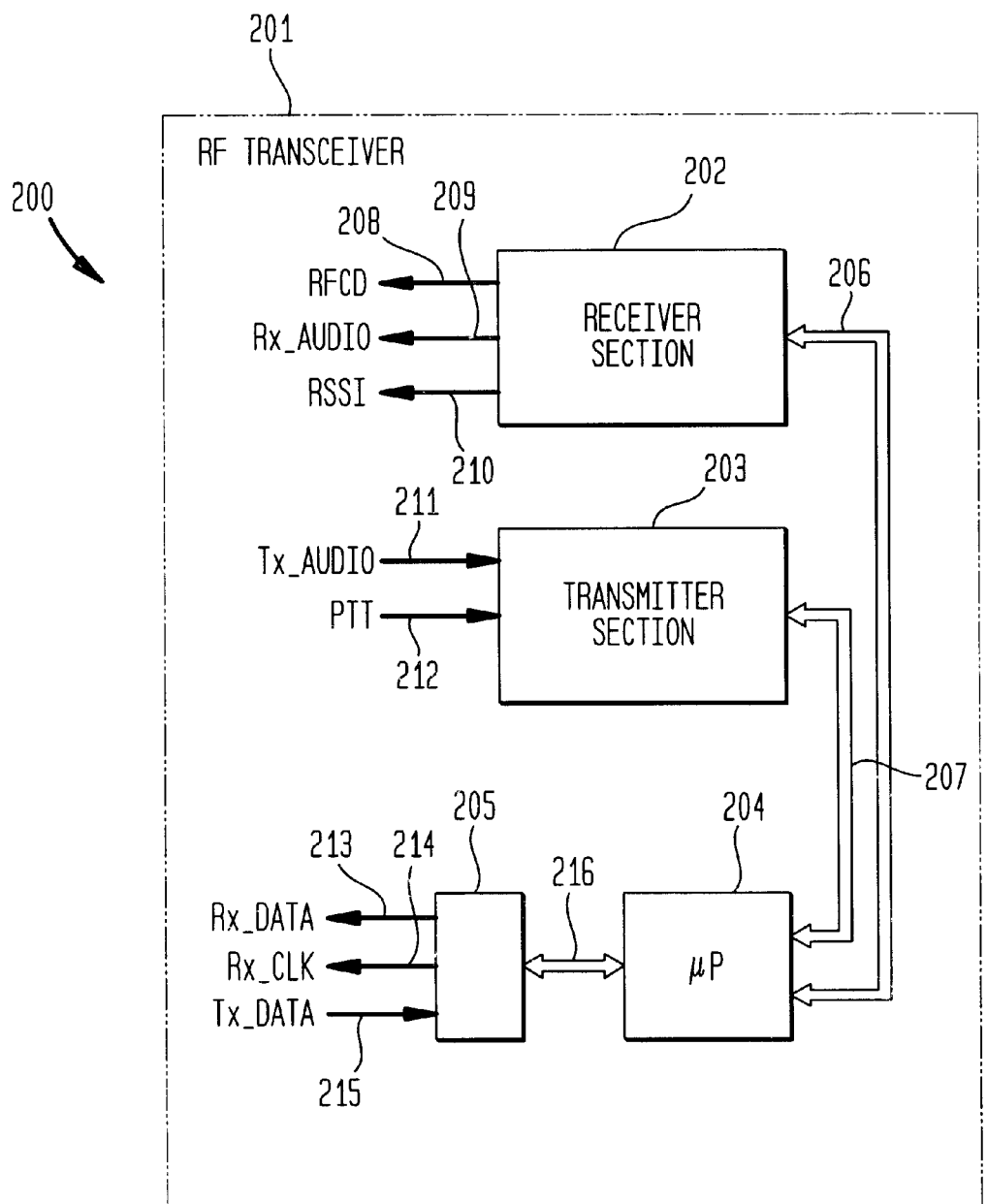
FIG. 2 is a block diagram of a RF transceiver showing signals that are controlled and monitored.

FIG. 2 is a block diagram 200 of a RF transceiver 201 showing signals that are controlled and monitored in the present invention. As shown, a microprocessor or microcontroller 204 is able to control both the receiver section 202 and the transmitter section 203 through connections 206 and 207, respectively. These connections include data lines, address lines, and miscellaneous control and status lines. In this way, the microprocessor or microcontroller 204 is able to perform all of the initialization for both the receiver 202 and transmitter 203 blocks which includes the transmitter power output and both the receiver and transmitter frequencies. The microprocessor or microcontroller 204 may also communicate with external devices which may be connected using a serial interface. Universal Asynchronous Receiver/

Transmitter ("UART") 205 provides the serial communications functionality and is controlled by the microprocessor or microcontroller 204 through connections 216 which include address lines, data lines and status and control lines. The UART 205 then uses the RX_DATA 213 line to receive serial data from the external device—typically a master or interface unit. RX_CLK 214 is the serial clock signal referenced to the RX_DATA 213 serial signal. In many applications, RX_CLK 214 is not necessary to communicate serially. Additionally, serial data may be transmitted from the RF transceiver 201 using the TX_DATA 215 serial output line.

The transmitter section 203 is connected to the microprocessor or microcontroller 204 through connections 207. Two external connections to the transmitter section enable an external device to drive the transmitter to transmit the audio signal TX_AUDIO 211 by asserting the logic signal Push-to-Talk (PPT) 212.

Similarly, the receiver section 202 is connected to the microprocessor or microcontroller 204 through connections 206. Connections between the receiver section 202 and an external device are provided using signals 208, 209, and 210. These signals are the Radio Frequency Carrier Detect (RFCD) signal 208 which is a logic level signal which is active when the receiver section 202 detects RF carrier at the frequency programmed by the microprocessor or microcontroller 204. The RX_AUDIO signal 209 is the voice-band signal which was demodulated by the receiver section 202 and is only valid when the RFCD signal 208 is asserted. Additionally, a Received Signal Strength Indicator (RSSI) signal 210 is available for connections to external devices. The signal provides a voltage which is proportional to the strength (in dBs) of the received RF signal. This connection may provide a means for the external device to poll several RF transceivers and if more than one are receiving an RF signal then the external device may select that RF transceiver which is receiving the strongest signal.

The present invention may include one or more antennas to receive and transmit signals. In one embodiment, separate antennas, one for receiving signals and another one for transmitting signals may be used. For example, a signal received at the receiving antenna may be transmitted by the transmitting antenna as the receiving antenna receives the signal. Further, the receiving antenna may receive a signal at the same time the transmitting antenna is transmitting a signal. In another embodiment, one antenna may function to receive and transmit signals.

Figure 3:
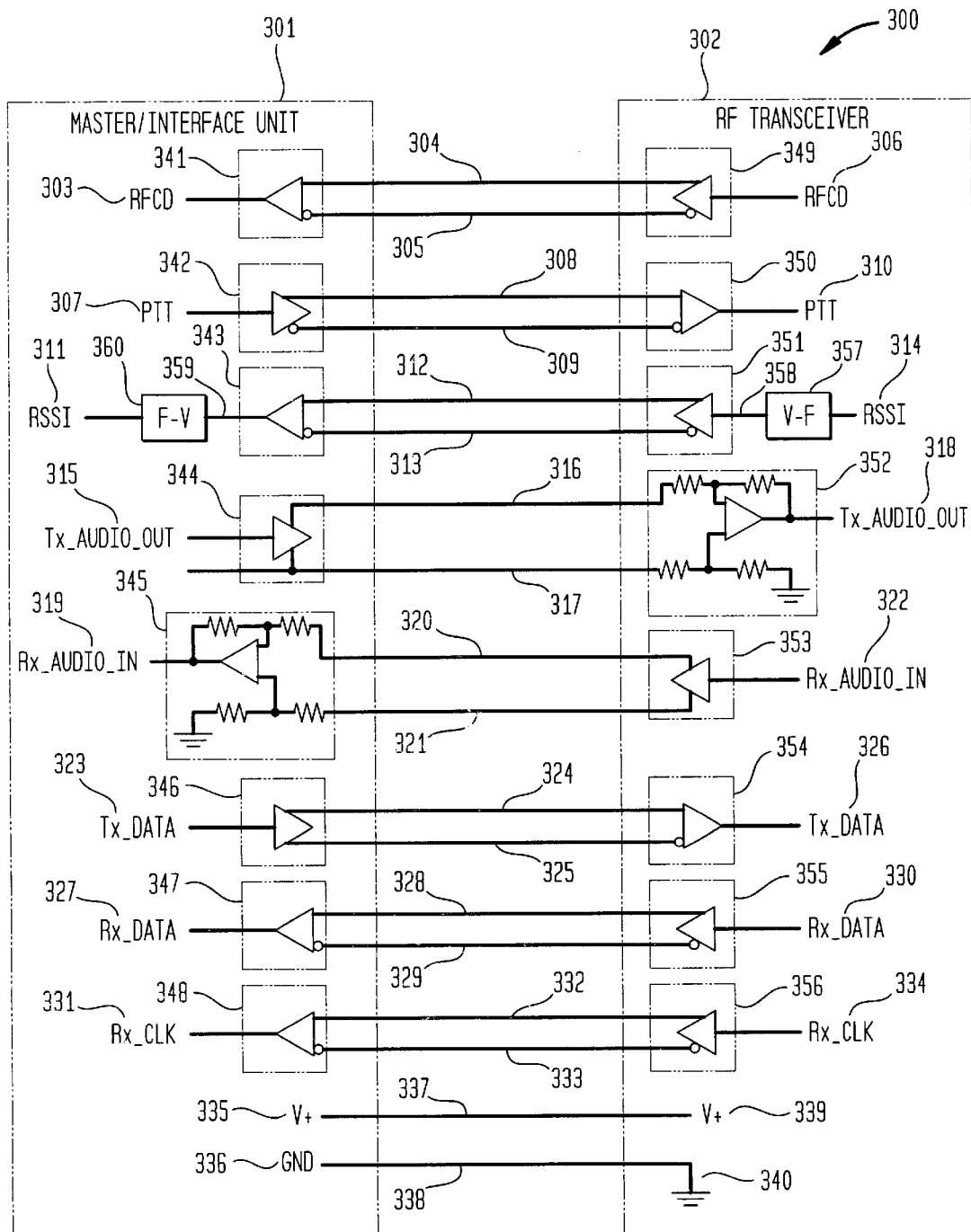
FIG. 3 illustrates the interface between Master or Interface Units and RF Transceivers.

FIG. 3 illustrates the interface between Master or Interface Units and RF Transceivers. When the RF transceiver 302 detects carrier, the Radio Frequency Carrier Detect (RFCF) 306 signal becomes active. Differential line driver circuit 349 converts the logic-level RFCD signal 306 to a differential pair of signals which are propagated differentially through conductors 304, 305 to increase noise-immunity such that the signal on conductor 304 has the same logic sense as the RFCD signal 306 while the signal on conductor 305 corresponds to the logic-inverse of the RFCD signal. These signals are received at the Master or Interface Unit 301 where they are converted back to a logic-level RFCD signal 303 by the differential line receiver 341. While the RFCD signal 306 is active, the RF Transceiver is receiving a valid audio signal. This signal is present at RX_AUDIO_IN 322 at the RF Transceiver 302. Balanced Line Driver 353 converts this signal to a balanced or differential set of voltages which are then transmitted over conductors 320, 321 where they are received and converted back to a single-ended RX_AUDIO_IN 319 signal by the balanced line receiver circuit 345 in the Master or Interface Unit 301.

Additional circuitry is available in both the Master and Interface Unit 301 and the RF Transceiver 302 so that digital information may be communicated serially between the Master or Interface Unit 301 and the RF Transceiver 302. For example, it may be advantageous to reprogram the RF Transceivers directly from the Master or Interface Unit 301 rather than at the RF Transceiver 203 which is typically located on the ceiling or wall of the site. To do this, the three signals TX_DATA 323, RX_DATA 327 and RX_CLK 331 are used. TX_DATA 323 represents the data signal which is used to communicate information serially to the RF Transceiver 302. This serial data is converted to differential signals by differential line driver circuit 341 and propagates over conductors 324, 325 to the RF Transceiver 302 where the signals are converted back to a single-ended serial data stream, TX_DATA 326, by the differential line receiver circuit 354. Similarly, any information which needs to be sent back to the Master or Interface Unit 301 is applied serially, for example, to the RX_DATA line 330 which is converted to a differential signal by the differential line driver circuit 355 and propagated over conductors 328 and 329 back to the Master or Interface Unit 301 where they are converted back to the single-ended serial data stream RX_DATA 327 by differential line receiver circuit 347. Additionally, a serial clock, RX_CLK 334, used for serial timing may be passed by differential line driver 356 from the RF Transceiver 302 over conductors 332, 333 where the signal is received by differential line receiver 348 at the Master or Interface Unit 301 although this is not always necessary and depends upon the serial implementation.

Another signal of interest, the Received Signal Strength Indicator ("RSSI") signal 314 may be sent from the RF Transceiver 302 to the Master or Interface Unit 301. This signal which represents the intensity of the received radio signal is typically an analog ("DC") voltage. In order to accurately send this signal to the Master or Interface unit, this signal is converted to a repetitive pulse signal 358 by a voltage-to-frequency converter circuit 357 such that the frequency of pulse repetition is proportional to the RSSI analog voltage. The pulse train 358 is sent differentially by differential line driver circuit 351 over conductors 312 and 313 to the Master or Interface Unit 301 where it is received by the differential line receiver circuit 343 and converted to the single-ended pulse train 359. The single-ended pulse train is then converted to an analog signal having a voltage proportional to the pulse repetition frequency by the Frequency-to-Voltage converter circuit 360. The output 311 of the Frequency-to-voltage circuit 360 is proportional to the RSSI signal 314 at the RF Transceiver 302 and may be used equivalently.

Supply voltages V+ 335 and GND 336 are sent over conductors 337 and 338 to the RF Transceiver 302 where they are received at terminals 339, 340 and are used to provide power to the RF Transceiver circuitry.

Figure 4:
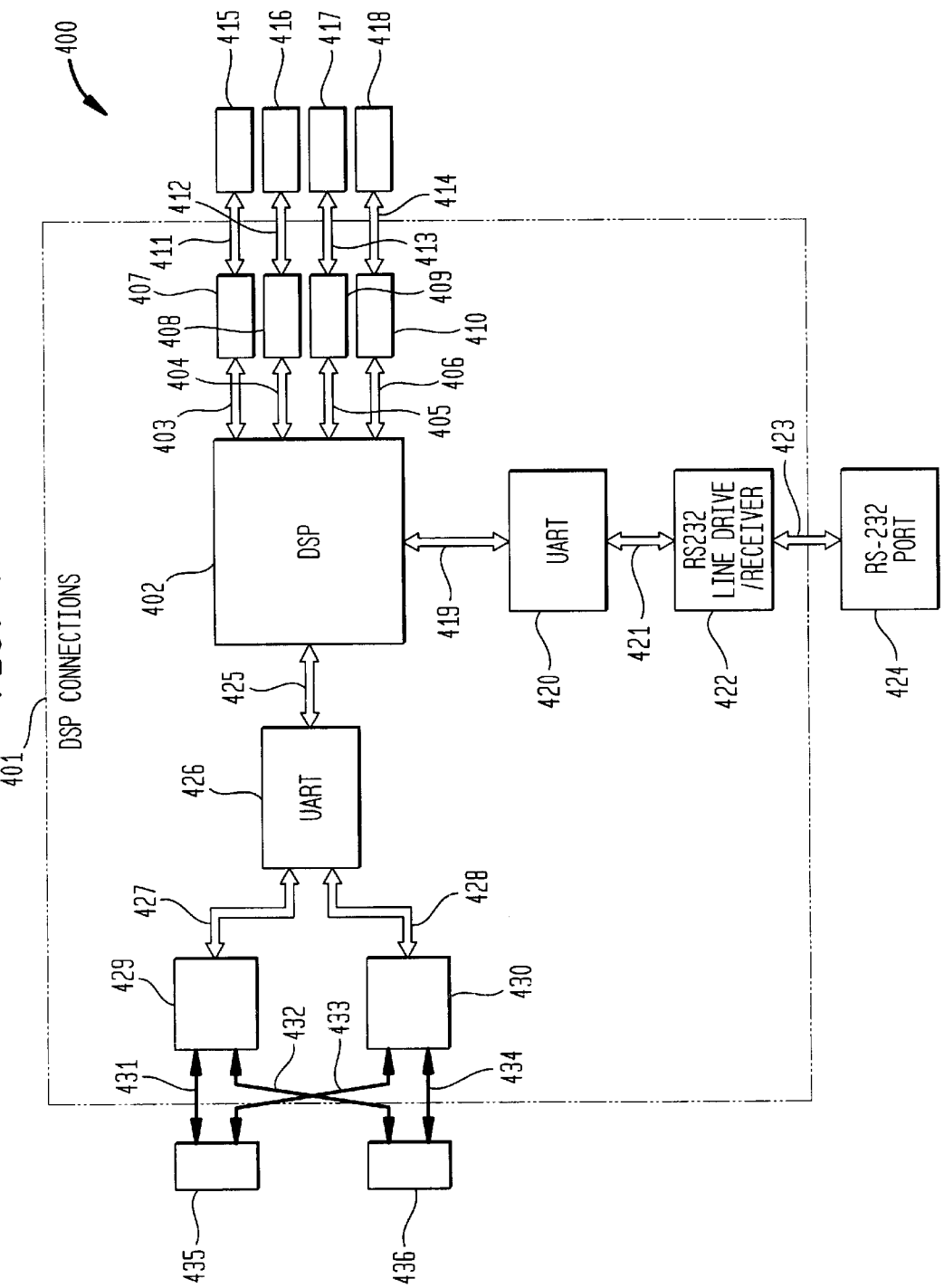
FIG. 4 shows the connections between the Digital Signal Processor (DSP) or microprocessor and external peripherals.

FIG. 4 illustrates connections between the DSP or microprocessor 402 on the Master or Interface Unit 401 and external peripherals. As shown, four RF Transceivers 415, 416, 417, 418 are connected to the Master or Interface Unit 301 by multiple-conductor cables 411, 412, 413, 414, respectively. The signals conveyed through the conductor cables are conditioned by circuitry 407, 408, 409, 410, respectively, which implements such functions as Analog-to-Digital conversion, Digital-to-Analog Conversion and Filtering. These functions are illustrated in more detail in FIG. 6. After conditioning of the signals they are interfaced directly to the DSP or microprocessor circuit 301 through connections 403, 404, 405, 406 respectively, where they are used to control and interpret the external signals in a digital form. These connections represent the address, data and control-logic connections typical of any DSP or microprocessor-based system.

FIG. 4 also illustrates the connection of the DSP or microproccessor circuit 402 to an RS-232 port 424 such a DB-9 or DB-25 connector. This may be used to connect the Master or Interface Unit to an external personal computer or to external monitoring equipment. In this way, the Master or Interface Unit 401 may transmit the information to any of the other Interface or Master Units to which it is connected via in-port 435 and out-port 436 connectors. The RS-232 serialization and timing are performed by the UART 420 which is connected to the DSP or microprocessor 402 by the data, address and control connections 419. The serial data and control lines which are controlled by the UART 420 are connected by conductors 421 to the RS-232 line driver/receiver circuit 422 which performs the functions of changing the voltage levels of these signals so that they are compatible with the RS-232 standard. These signals are then connected through conductors 423 to the RS-232 port 424 which may be a DB-9 or DB-25 connector.

Figure 7:
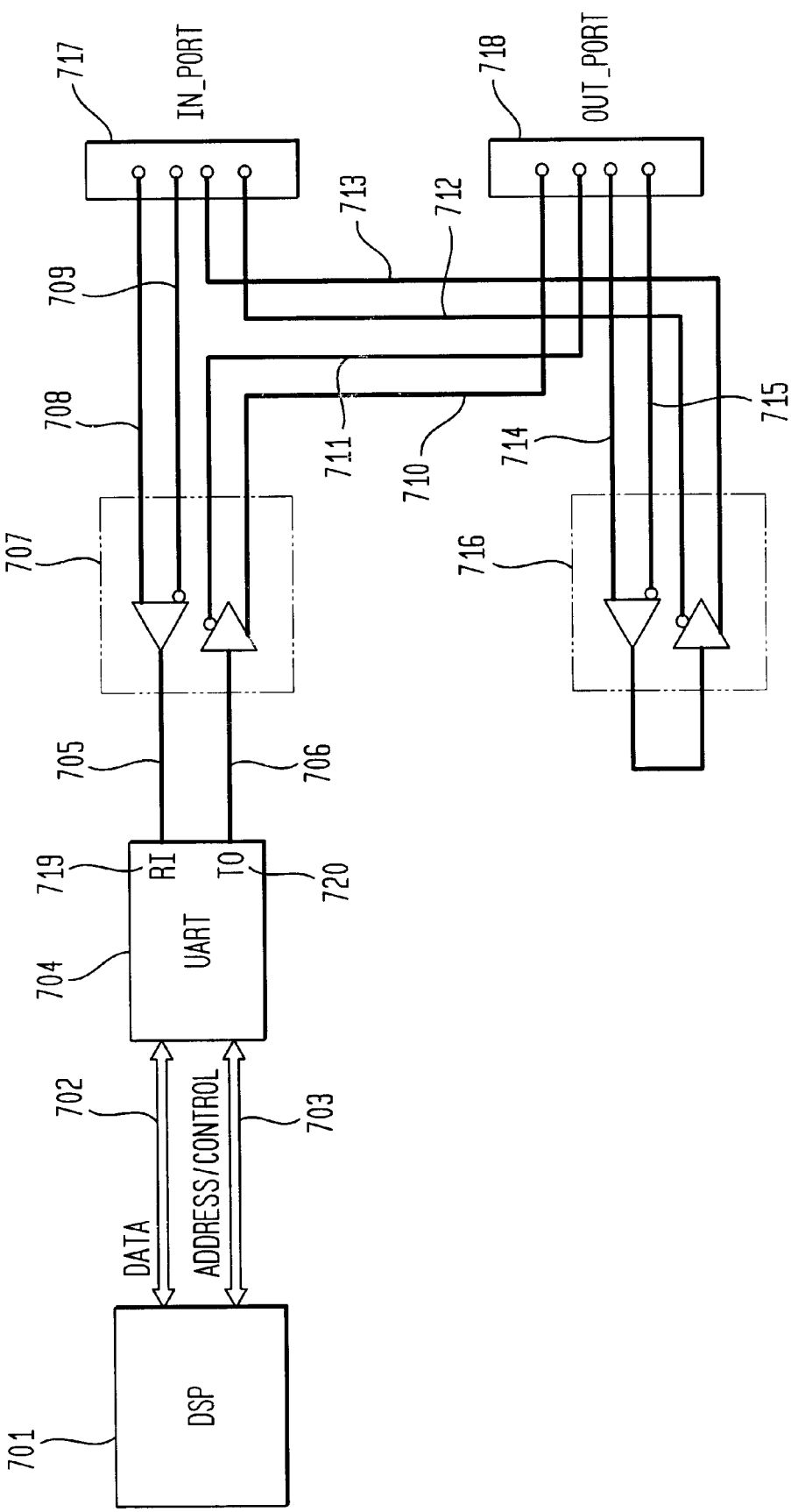
Figure 8:
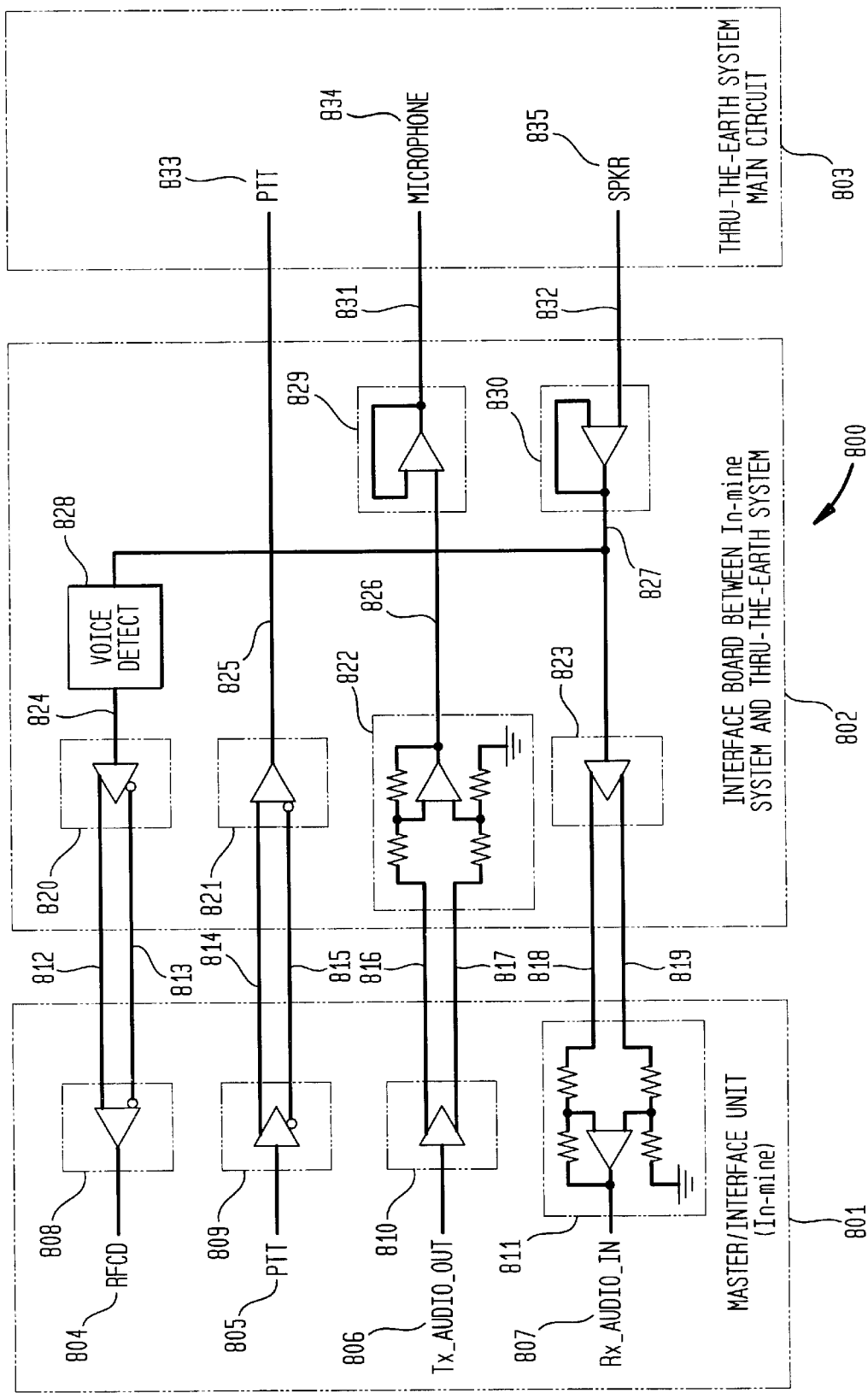
FIG. 8 illustrates an exemplary interface between the facility-wide system and through-the-earth system.

To communicate between Master and Interface Units, each Master or Interface Unit may have one or more UARTs which are connected to the DSP or microprocessor 402 by the data, address and control lines 425. FIG. 4 illustrates one UART 426 as an example. FIG. 7 illustrates, in detail, one UART connected to the DSP or microcontroller. FIG. 8 illustrates, in detail, two UARTs connected to the DSP or microcontroller. Referring back to FIG. 4, the UART is connected to differential line driver/receiver circuits 429, 430 by connections 427, 428. The differential line driver/receiver circuits interface to in-port 435 and out-port 436 connectors through connections 431, 432, 433, 434.

Figure 5:
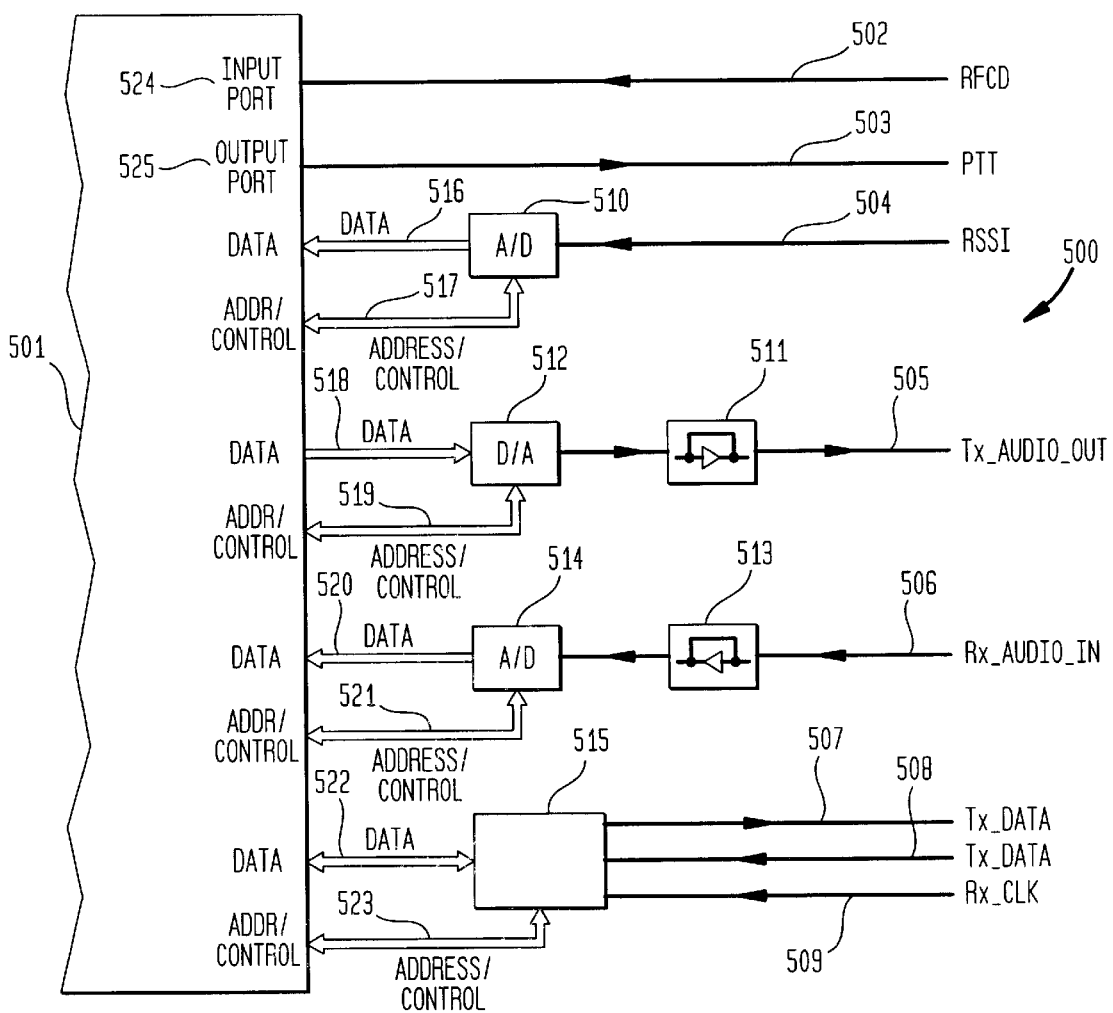
FIG. 5 illustrates the connection between the DSP or microprocessor and the signals received from external peripherals.

FIG. 5 illustrates the signal conditioning performed on the signals from one of the external RF Transceivers which are connected to the Master or Interface Unit. These signals are used to interface the DSP or microprocessor 501 to the RF Transceiver. As shown, the signal RFCD 502 is the received single-ended signal which indicates that the RF Transceiver which is connected to the Master or Interface Unit is receiving a valid RF transmission. This signal is connected to the DSP or microprocessor through either an internal input port or through a latch connected directly to the DSP or microprocessor. When this signal is active, the RX_AUDIO_IN signal 506 includes the demodulated signal, e.g., voice, which the RF Transceiver is receiving. The RX_AUDIO_IN signal 506 is first filtered and gain-adjusted by the signal condition circuit 513. This signal is then input into an Analog-to-Digital converter 514 so that the DSP or microprocessor 501 may access it through data lines 520 in digital form. Address and control lines 521 are used to periodically select and sample the digitized output of the analog-to-digital converter 514. Typically, the analog-to-digital converter is sampled at a rate of 8000 samples each second with each sample having 8 bits of information. Higher sampling rates and sample resolution, e.g., number of bits may be used. In one embodiment, a speech coder may be used to reduce the overall bit rate. The overall bit rate is generally the product of the sampling rate in samples-per-second and the sample resolution in bits-per-sample. Alternatively, a higher network bandwidth to convey the sampled voice data between each control unit connected to the network may be utilized. Generally, an 8 kHz sample rate is considered adequate for speech processing applications.

The DSP or microprocessor 501 asserts the output port, or externally latched output, 525 which is connected to the Push-to-Talk (PPT) signal which is used to communicate to the RF Transceiver that the DSP or microprocessor 501 has a voice signal in TX_AUDIO_OUT 505 which should be modulated and transmitted by the RF Transceiver. This signal is generated by the DSP or microprocessor 501 by sending the digital samples which represent the signal to the Digital-to-Analog Converter 512 and also to select the Digital-to-Analog Converter 512. The output of the Digital-to-Analog Converter 512 is filtered and gain-adjusted by the signal-conditioning circuit 511.

The Received Signal Strength Indicator voltage 504 which has been converted from a periodic pulse train to a voltage proportional to the frequency is applied to the Analog-to-Digital Converter 510. This digital output of the Analog-to-Digital converter is sampled by the DSP or microprocessor via the data lines 516 and address/control lines 517. In this way, the DSP is able to obtain a measure of the strength of the signal being received by the RF Transceiver. This signal is typically valid while the RF Transceiver detects RF carrier, i.e., the RFCD signal 502 is asserted active.

In addition, the Master or Interface Units may include devices to enable serial communications between the Master or Interface Unit and each RF Transceiver connected to the Master or Interface Unit. For example, the UART 515 which is connected to the DSP or microprocessor by the data 522 and address and control lines 523 may be used to enable this serial communication. The outputs of the UART 515, TX_DATA 507, RX_DATA 508, and RX_CLK 509, are connected to differential line drivers/receivers, as shown in FIG. 5, and then connected externally to a RF Transceiver. The TX_DATA signal 507 includes the serial information which is transmitted from the Master or Interface Unit to the RF Transceiver while the RX_DATA signal 508 includes the serial data stream which is sent from the RF Transceiver to the DSP or microprocessor 501 on the Master or Interface Unit. Typically the RF Transceiver only sends information over the RX_DATA line 508 in response to a command from the DSP 501 on the TX_DATA line 507. The RX_CLK is a periodic clock signal used for synchronizing the serial communications between the Master or Interface Unit and the RF Transceiver.

Figure 6:
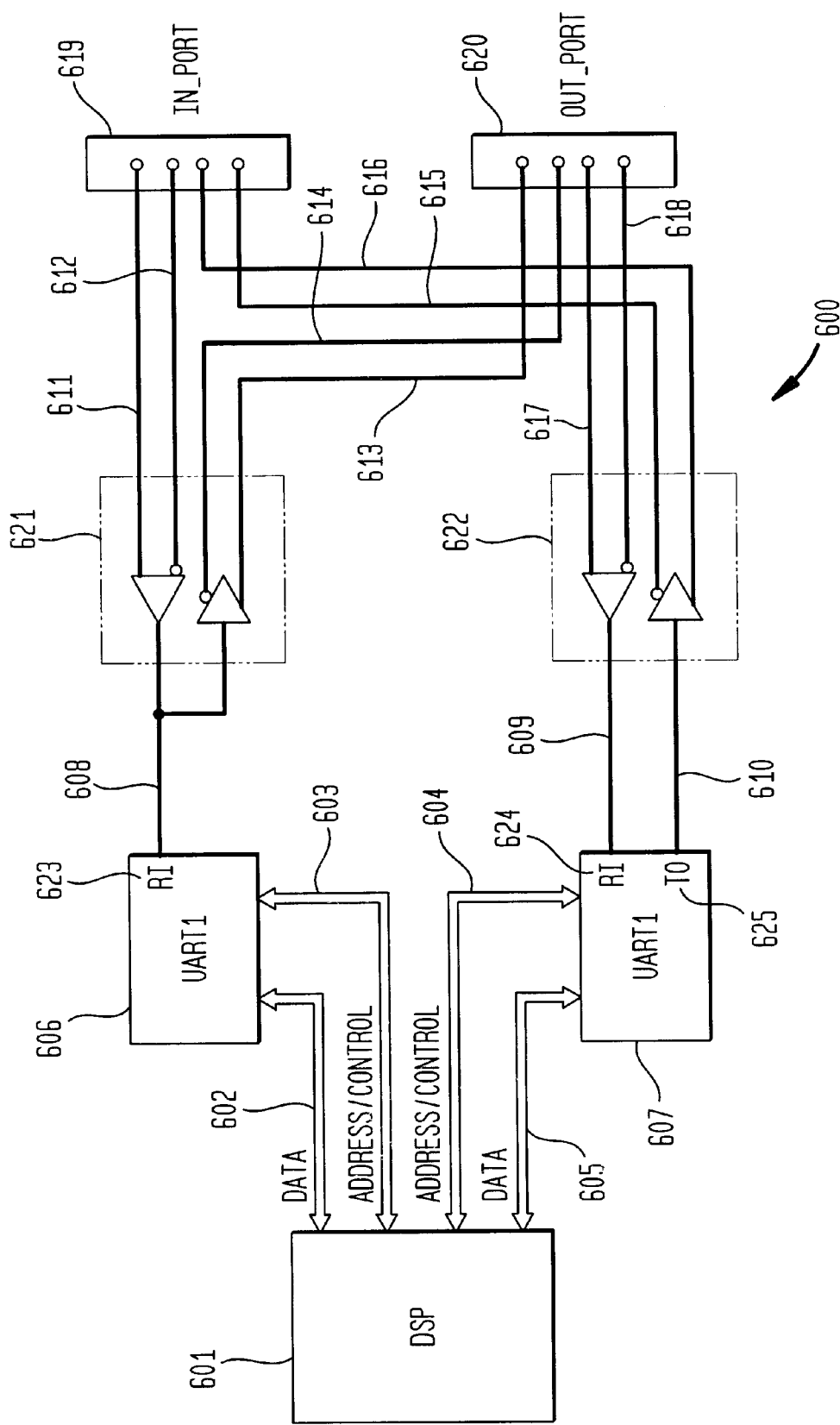
FIGS. 6–7 illustrate an example of one implementation of the connections between the DSP or microprocessor and the network.

FIG. 6 illustrates a scheme for connecting the DSP or microprocessor to the in-port 619 and out-port 620 network connectors in one embodiment of the present invention. The circuitry shown in FIG. 6 enables each Master or Interface Unit to communicate with every other Interface or Master Unit. The DSP or microprocessor 601 is interfaced to UART1 606 and UART2 607 through the data and address/control lines 602, 603, 604, 605. UART1 606 is used to receive serial data at its Receive Input ("RI") signal port 623. The data received by UART1 606 is introduced to the Master or Interface Unit at the in-port connector 619 on the differential signal lines 611, 612. Differential Line Driver/Receiver 621 converts these differential signals to a singled-ended, logic-level signal which can be interpreted by UART1 606. Differential Line Driver/Receiver 621 also performs a buffering function by recording the logic-level, single-ended signal back to a differential pair of signals 613, 614, and sending them to the out-port 620. In this configuration, UART1 is used to process any speech data which needs to be sent to one of the RF Transceivers connected to the Master or Interface Unit for RF transmission or alternatively to send any digital data to an RS-232 device which may be connected to the Master or Interface Unit.

UART2 607 is used to both receive serial data from the out-port 620 and transmit serial data to the in-port 619.

Serial data received at the out-port 620 on differential signal lines 617, 618 is converted to a singled-ended, logic-level serial pulse stream by the Differential Line Driver/Receiver circuit 622 and the logic-level, single-ended serial pulse stream is connected to the Receive Input ("RI") 624 on UART2 607. This information is processed by the DSP or microprocessor 601 and, if the DSP or microprocessor 601 has any speech samples or digital data available to send to other Master or Interface Units connected to the network, the DSP or microprocessor 601 adds this data to the serial stream and sends it to UART2 607 for transmission over the network. Otherwise, if the DSP or microprocessor 601 does not have any speech samples or digital data from the RS-232 port available, it sends the received signal back to UART2 607 unmodified. The Transmit Output signal 625 of UART2 607 is sent to Differential Line Driver/Receiver 622 where it is converted to a differential pair of signals and sent to in-port 619 over conductors 615, 616.

FIG. 7 illustrates an interface between the DSP or microprocessor to the in-port and out-port network connectors in one embodiment. A UART 704 is connected to a DSP or microprocessor 701 through the data 702 and address and control lines 703. Serial data received at the in-port 717 is conducted differentially to differential line driver/receiver 707 over wires 708 and 709 and converted to a singled-ended, logic-level serial stream and sent to the receive input port 719 of UART 704 over wire 705. The received signal is then available for processing by DSP or microprocessor 701. If the DSP or microprocessor 701 has any speech samples or digital data from the external RS-232 connection available to send to other Master or Interface Units connected to the network, then this data is added to the serial data stream which is sent back to the UART 704 for transmission over the network. The UART 704 sends the serial data out of the transit output port 720 to differential line driver/receiver 707 which converts the serial information stream differentially over wires 710 and 711 to out-port 718. If the DSP or microprocessor 701 does not have any speech samples or digital data to place on the network data stream, it sends the received serial data back to UART 704 for transmission over the network. The UART 704 sends the serial data out of the transmit output port 720 to differential line driver/receiver 707 which converts the serial information stream differentially over wires 710 and 711 to out-port 718. If the DSP or microprocessor 701 does not have any speech samples or digital data to place on the network data stream, it sends the received serial data back to UART 704, unmodified. The differential line driver/receiver 716 may be used to buffer serial data received differentially on wires 714, 715 from out-port 718 and to send the buffered data over wires 712 and to in-port 717.

The configurations shown in FIGS. 6 and 7, particularly, the connections between in-ports, out-ports and Differential Line Drivers/Receivers allow for simple one-to-one or "straight-through" cabling connections between the out-port side of one Master or Interface Unit and the in-port side of the Interface or Master Unit to which it is connected. By connecting Master or Interface Units to each other in this manner, a serial data stream can be passed between each Master or Interface Unit on the network and after each Master or Interface Unit has accessed the serial data, it is returned back to the originating Master or Interface Unit. Master or Interface Units which are positioned at an end of the network, i.e., they do not have a connection to either a Master or Interface Unit on either the in-port side or the out-port side, are terminated by connecting the outgoing differential serial lines to the incoming serial lines at either the in-port or out-port. For example, referring to FIG. 7, if no unit is connected to the in-port connector 717, then a "terminator" is placed on the in-port connector 717 so that the serial output data on lines 712, 713 are connected to the serial input data of lines 708, 709, respectively. This allows the serial data stream to flow in a circular manner between all Master and Interface Units connected to the network.

FIG. 8 illustrates an interface between the Through-the Earth System and the Facility-Wide System. This interface enables connection between a Master or Interface Unit to communicate through the earth to a location outside of a mine by using the RF Transceiver interface on the Master or Interface Unit. Through-the-earth System of the present invention will be described in greater detail with reference to FIGS. 14–16. Referring back to FIG. 8, when it is desired to transmit from Master or Interface Unit 801, the Push-to-Talk signal 805 is asserted and this signal is sent differentially over wires 814, 815 to the through-the-earth Interface 802 which resides physically with the through-the-earth System. This signal is converted back to a single-ended, logic-level signal 825 by Differential Line Receiver 821 and sent to the main circuit board of the through-the-earth System 803 where it is used to engage the transmitter circuitry of the through-the-earth System. When the Push-to-Talk signal 805 is asserted, the TX _AUDIO_OUT signal 806 includes the speech waveform to be transmitted through the earth. This signal is converted to a balanced, or differential, pair of signals by Balanced Line Driver 810 and sent over wires 816, 817 to the through-the-earth Interface Board 802 where they are received by the Balanced Line Receiver 822 and converted back to the single-ended signal 826. Circuit 829 is used to filter and gain adjust the received single-ended signal 826 and the output is connected to the microphone input 834 on the main circuit of the through-the-earth system via wire 831.

In one embodiment, the Through-the Earth system is continuously receiving or demodulating low-frequency RF signals except when requested to transmit, e.g., when the Push-to-Talk signal is asserted. Typically, this demodulated signal is applied to the speaker output 835 of the through-the-earth System. To communicate with the Facility-Wide System, however, the speaker output 835 may be applied to the interface over wire 832 where it is filtered and gain-adjusted by circuit 830. The output 827 is sent to Balanced Line Driver 823 where it is converted to a differential pair of signals and sent over wires 818, 819 to the Facility-Wide System 801. The Facility-Wide System 801, using Balanced Line Receiver circuit 811 converts the differential signals back to a single-ended signal which is interpreted as the RX_AUDIO_IN signal 807. In one embodiment, RX_AUDIO_IN signal is continuously present in the system except when Push-to-Talk 805 is asserted. Therefore, to determine whether or not voice data is present in the RX_AUDIO_IN signal 807, the present invention in one embodiment applies the output 827 of the filtering and gain-adjust circuit 830 to a voice detect circuit 828 which asserts its output only when voice is detected. A voice detect system of the present invention in one embodiment is illustrated in more detail in FIG. 9.

Referring back to FIG. 8, the output of the voice detect circuit 828 is connected by wire 824 to a Differential Line Driver which sends its differential output to the Facility-Wide system Master or Interface Unit 801 over wires 812, 813 where Differential Line Driver 808 converts the differential signal back to a single-ended signal which is interpreted as the Radio Frequency Carrier Detect signal 804. In this way, the Master or Interface Unit to which the throughthe-earth system is connected only processes the received RX_AUDIO_IN signal 807 when voice is detected on the speaker output of the through-the-earth system 803.

Figure 9:
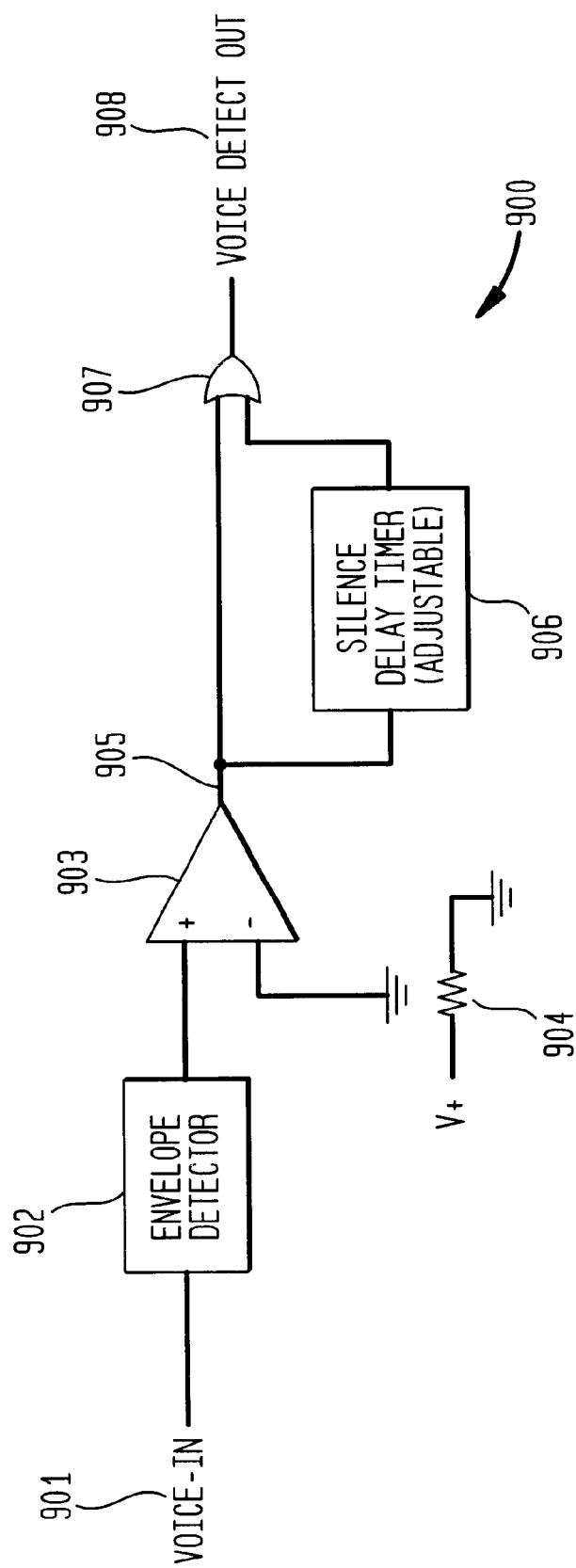
FIG. 9 illustrates one implementation of the voice detector block illustrated in FIG. 8.

FIG. 9 illustrates a voice-detect system in one embodiment of the present invention. In this embodiment, the output of the speaker of the through-the-earth system is applied to the voice-in input 901 which is connected to an envelope detector 902. The output of the envelope detector is applied to comparator 903 and compared to an adjustable reference voltage 904. The comparator output goes high when the envelope of the voice-in input 901 exceeds the reference voltage 904. To compensate for pauses during speech, the output of the comparator is connected to a silence delay timer 906 that outputs a time-delayed, typically 1–2 seconds, copy of the comparator output. This delay may be implemented using a one-shot monostable multivibrator. The output of the silence delay time is logically-ORed with the comparator output at OR-gate 907 to produce the voice-detect output signal 908 which may be used as the Radio Frequency Carrier Detect signal in FIG. 8 as signal line 904.

FIG. 10 illustrates an example of a data block format 1000 that may be used with the Facility-Wide system of the present invention. Each block of data sent over the network interface, includes one or more synchronization bytes 1002 of data set to a preset value. These bytes 1002 are used to enable each Master or Interface Unit to recognize the beginning of a data block. Following the synchronization bytes 1002 are voice channel data blocks for each of four channels 1004, 1006, 1008, 1010. The four voice channel blocks 1004, 1006, 1008, 1010 are followed by a digital channel data block 1012. Optionally, a checksum 1014 which includes the sum of all bytes in the data block 1012 may follow the data block 1012. The checksum 1014 is used to determine if any errors occurred during transmission of the data block 1012 by comparing the received checksum 814 to the sum of all bytes received. If an error has occurred during transmission, the received checksum will not match the sum of all received bytes in the data block.

FIG. 11 illustrates an example of a voice channel data block format 1100. The first byte of the channel data block 1100 is a command byte 1102 which specifies both the channel index and the type of message which is being sent. The command byte 1102 is followed by an address byte 1104 which specifies the address of the Master or Interface Unit which sending the channel block. Following the address byte are 16-samples of 8-bit pulse code modulated ("PCM") speech data sampled at 8 kHZ 1106. This corresponds to 2 milliseconds of speech data. Since the speech samples 1106 arrive continuously to each Master or Interface Unit, this dictates a new data block arrive every 2 milliseconds to enable speech playback without any pauses. Optionally, a checksum 1108 may be transmitted following the 16-bytes of speech samples 1106, to enable detection of errors during transmission over the network. However, this is not always necessary since bit errors in PCM coded speech do not significantly reduce the intelligibility of the speech.

FIG. 12 illustrates the command byte format 1200 in one embodiment of the present invention. Bits 0 to 3 (1202) of the command byte 1200 represent the index of the channel corresponding to the speech samples. Bits 4 to 7 (1204) represent the type of message corresponding to the speech samples. For example, the speech samples may correspond to a Broadcast Message such that every Master or Interface unit is to play back the speech samples. Another type of message is an Empty Message which indicates that the speech samples are invalid and should not be played back by any unit. Other message types include Priority Messages, Paging Messages and Digital Messages.

FIG. 13 illustrates the digital data block 1300 in one embodiment of the present invention. The first byte of the digital data block format includes a command byte 1302 which may be either an Empty Message or a Digital Message. The command byte 1302 is followed by the address 1304 of the Master or Interface Unit that placed the digital data in the digital data block 1300. The address 1304 is followed by one or more actual data bytes 1306, 1308 which are transmitted over the network. FIG. 13 shows two data bytes 1306, 1308, as an example, however, any other number of bytes may be embedded in the digital data block 1300. Optionally, a checksum 1310 may follow the data bytes 1306, 1308, for example, for error checking.

Through-the-earth Communications System

The wireless communication method and apparatus of the present invention enables communications in energy transmission limited environments such as a mine. For example, the present invention enables communications between the mine interior and the surface. In one embodiment, communication through-the-earth ("TTE") between the surface and the mine interior is by low frequency, e.g., in the range of 3,000 Hz and 8,000 Hz, between loop antennas connected to TTE transceivers. For voice communication, a telephone handset may be connected to TTE transceivers. Alternatively, wireless two-way radios may be used to communicate with the TTE transceivers using an RF base-station interface to the TTE transceiver. For digital data transmission, a keyboard or output terminals of a sensor may be directly connected to the TTE transceivers. Wireless digital transceivers may also be used to communicate with the TTE transceiver. Wireless in-mine (IM) or facility-wide (FW) communication inside the mine may be accomplished by UHF or VHF two-way radios and remotely-located control units to which antenna modules are connected. In an exemplary embodiment, the control units are connected to, and communicate through existing power lines, requiring no new wire installation. In another embodiment, a skeleton of category 5 or equivalent, wire interconnects the remote control units. These are small cross-section, easy to install wires. For covering equal communication areas, less wire is required than is required using leaky feeders. The TTE and IM sections, or subsystems, are interfaced to allow underground workers to communicate freely with other underground workers as well as with surface personnel. Communication can be by voice or by digital data to communicate production and environmental information and to communicate control commands. Alternately, the two subsystems may be used independently for only through the earth or only in mine communication.

TTE Transceiver Subsystem

Figure 14:
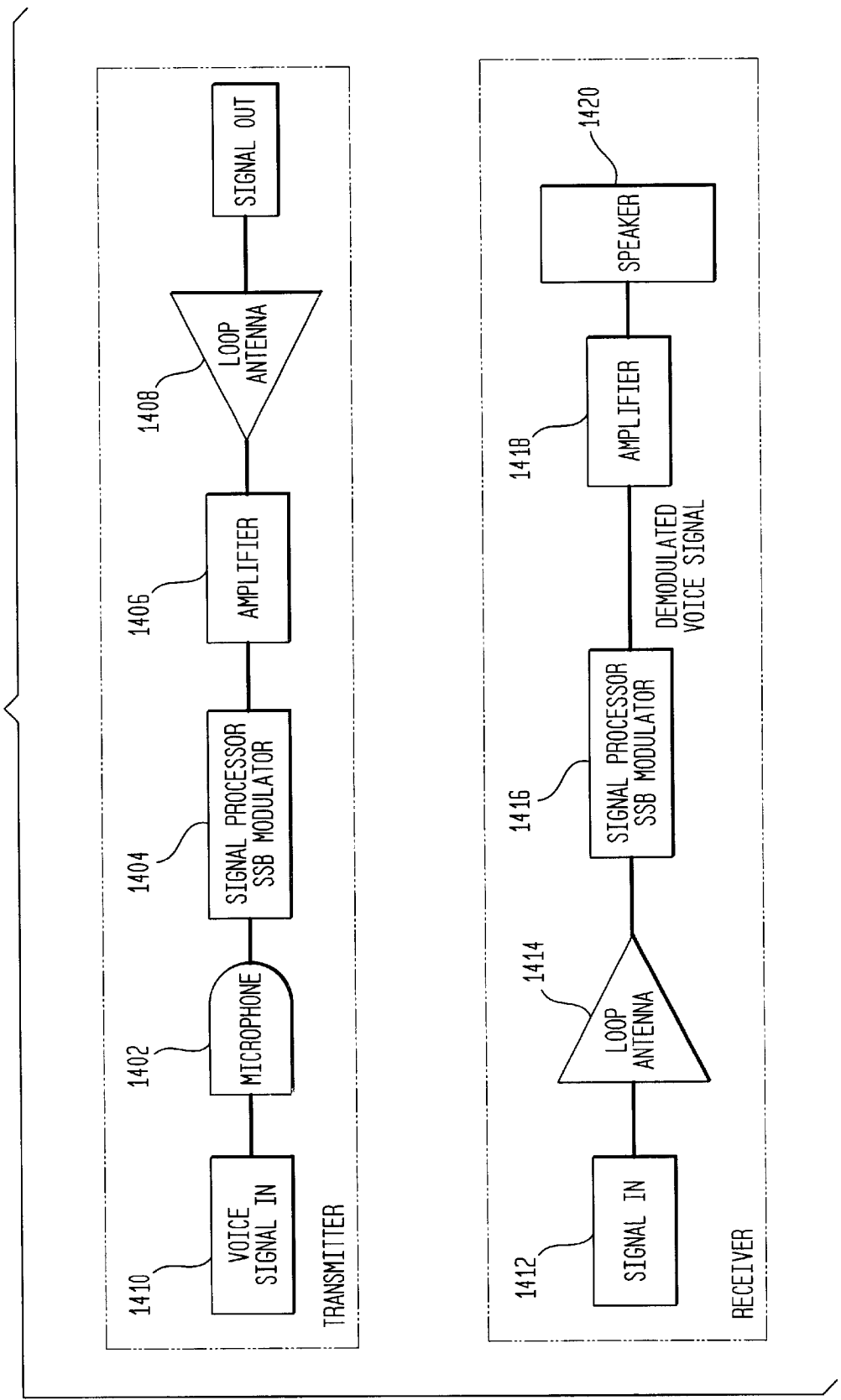
FIG. 14 illustrates a simplified diagram of the invention for through-the-earth ("TTE") voice communication.

FIG. 14 illustrates a simplified diagram of the present invention for through-the-earth ("TTE") voice communication. For voice communication, the signal from a microphone is modulating a single sideband ("SSB") modulator carrier signal. The carrier signal can typically be in the 3,000 Hz to 8,000 Hz range. The SSB output from the modulator 1404, e.g., lower sideband, is amplified by the amplifier 1406 and applied to the transmitting loop antenna 1408. At the receiving end, the SSB signal 1412 is coupled to the receiving loop antenna 1414, demodulated by signal processor/demodulator 1416, amplified by amplifier 1418, filtered, and applied to a speaker 1420.

Figure 15:
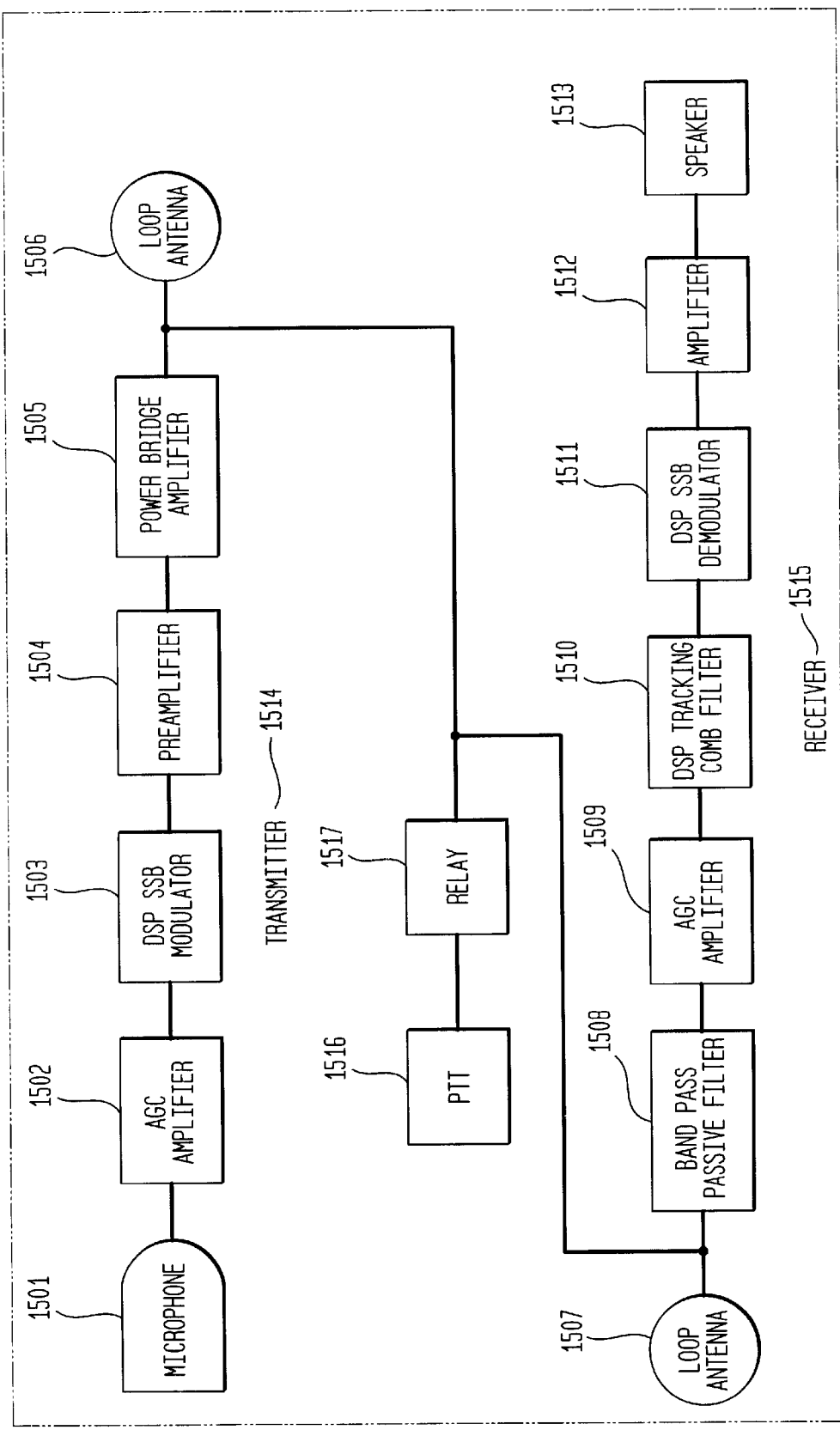
FIG. 15 illustrates one embodiment of the invention for through-the-earth ("TTE") voice communication.

FIG. 15 illustrates a detailed diagram of the through-the-earth system of the present invention enabling voice communication in one embodiment. For two-way communication, the unit at each location includes a transmitter and a receiver, e.g., a transceiver. For illustration purposes the transmitter and receiver are shown separately. Elements such as DSPs may be common to the transmitter and the receiver.

Referring now to the transmitter 1514 shown in FIG. 15, the voice message enters a microphone 1501, and the electric output from the microphone enters an automatic gain control ("AGC") amplifier 1502. An amplifier with analog gain control, e.g., a potentiometer, or digital gain control, e.g., an A/D converter, may also be used in addition or in place of the AGC amplifier 1502. The output from the amplifier 1502 enters a single sideband ("SSB") modulator 1503. FIG. 15 illustrates a Digital Signal Processor ("DSP") used to perform the modulation. Alternatively, an analog single sideband modulator may be used to perform the modulation. The output from modulator 1503 is amplified in preamplifier 1504 and the bridge power amplifier 1505. The output from power amplifier 1505 is applied to the transmitting loop antenna 1506.

The energy in the transmitting antenna is coupled to the receiving antenna by magnetic flux linkages, e.g., Faraday coupling. The strength of the antenna signal is expressed in terms of the magnetic moment. The magnetic moment is defined as the product of the current in the antenna and the area enclosed by the antenna. The enclosed area is defined as the area enclosed by one turn of the loop antenna times the number of turns. The bridge power amplifier is able to supply high current into the antenna without the need for a high voltage supply.

At receiving end or receiver 1515, the output signal from the receiving antenna 1507 is applied to a passive band-pass filter 1508. This filter removes unwanted noise voltages below, for example 500 Hz and above, for example, 12,000 Hz. In one embodiment, a passive filter rather than an active filter is used because the noise voltage entering with the signal may be high enough to saturate the amplifiers in an active filter causing distortion of the desired signal. Passive filter 1508 may be followed with additional active filtering. The output signal from passive filter 1508 is applied to the input of automatic gain control ("AGC") amplifier 1509 that assures that the voltage fed to the DSP 1510 does not exceed voltage limits that can be processed by DSP 1510. In one embodiment of the present invention, DSP 1510 is programmed to perform the function of a tracking comb filter. Harmonics of, for example, 60 Hz voltage caused by power lines or machinery can induce noise voltages in the receiving antenna in the frequency range of the desired signal used by the communication system. The comb filter is designed to lock onto one or more of these harmonics and attenuate all the harmonics and sub harmonics of these frequencies to levels sufficiently low to result in a sufficiently large signal-to-noise ratio allowing for the signal to be detected. Since the fundamental frequency, e.g., 60 Hz, of these harmonics may drift with time, causing the harmonics to drift, the comb filter is designed to track the harmonics and attenuate them even when they drift. DSP 1510 may also be programmed to perform additional filtering including half-wave averaging and median filtering to remove noise spikes. The output signal from DSP 1510 is applied to the input of single sideband ("SSB") demodulator 1511 to recover the voice signal. Demodulator 1511 may be programmed into a separate DSP, it may be part of DSP 1510, or it may be an analog demodulator. The output signal from demodulator 1511 is amplified in amplifier 1512 and applied to speaker 1513. In another embodiment of the present invention, a fixed comb filter may be used in place of a tracking comb filter. In this case, to accommodate harmonics that drift, the comb filter notches are designed to be wider.

A high level of filtering may be performed in the receiver to allow even a low signal, for example, a signal of a few micro-volts in magnitude, to result in a signal-to-noise ratio large enough to detect the signal. Requirements for intrinsic safety imposed by regulatory agencies, for example, Mine Safety and Health Administration ("MSHA") in the United States, mandate instantaneous energy stored in an antenna not to exceed certain levels. The requirements are imposed to prevent igniting gases, e.g., methane, in a mine that may be caused by an electric spark in case of antenna damage. Therefore, it is desirable to make it possible to detect low signal levels to accommodate relatively low transmitting power from inside the mine.

The method and system of the present invention enables wireless through-the-earth communication through relatively long distance, e.g., hundreds of feet, while keeping the antenna current low enough to meet intrinsic safety requirements. Under conditions that may require the antenna to store energy above intrinsically safe limits, the antenna is enclosed in an MSHA approved, or equivalent, wire-hose to render it damage proof and acceptable to regulatory agencies.

To keep the required power input into the antenna low, the antenna is tuned with a series capacitor to reduce the impedance of the circuit. The capacitors in the present invention also meet the intrinsic safety regulation requirements. For example, to simplify the overall design, the capacitor is enclosed inside the transceiver enclosure that is made explosion proof. The terminal connections between the antenna and the enclosure are also made explosion proof.

At each station the same antenna may be used for both signal transmission and signal reception. When Push-to-talk switch 1516 is activated, a relay 1517 connects the antenna to the transmitter output terminals. When push-to-talk 1516 is released, the antenna is connected to the receiver input terminals.

An advantage of using two separate antennas is that the transmitting antenna may use a small number of turns with small resistance so that the power amplifier of the transmitter may provide high current to the antenna to produce a high magneto-motive force without requiring excessive voltage, e.g., not to exceed 24 volts peak-to-peak. The receiving antenna may have many turns, so that a relatively high voltage, e.g., several millivolts, is induced in it that is applied to the input voltage amplifier of the receiver. If the receiving antenna were the same as the transmitting antenna, having a few turns, it would be advantageous to use a transconductance amplifier for the input amplifier of the receiver to transduce the antenna current into voltage.

For a transceiver, a telephone handset may be used. Alternatively, a two-way radio may be used as a transceiver. In this case, a two-way radio circuit is designed into the TTE transmitter. The voice output voltage signal of the two-way radio circuit, in response to a message sent by a person using a conventional two-way radio, instead of being applied to a power amplifier that feeds the speaker in a conventional two-way radio, connects to the input of AGC amplifier 1502. At the destination TTE transceiver, the received signal, after being processed through blocks 1501 through 1511, instead of being connected to amplifier 1512, is connected to an amplifier of the two-way radio circuit to which in conventional two-way radios the microphone output is connected. The two-way radio circuit transmits the signal to a conventional remote two-way radio.

Many variations of the system may be evident to a person skilled in the art. Examples include a telephone handset that may be used at one station, while a two-way radio is used at the other station. Further, a desk console having a microphone and a speaker also may be used.

The present invention is not limited to two stations. While coupling exists between two vertically displaced loop antennas, coupling also exists between radially displaced antennas in addition to being vertically displaced. A mathematical model and tests have confirmed that if the radial displacement is equal to the vertical displacement, the reduction in coupling is only by a few percent. Thus, for example, one station on the surface of the mine may communicate with several stations inside the mine. There exist also flux linkages between horizontally displaced antennas on the same plane. Thus, several stations inside the mine at a radial distance from one another may communicate.

The present invention is also applicable to digital communications described herein below. Applications include monitoring environmental, safety, and production data, and controlling these variables. Sensor output terminals may be connected to the TTE transceiver through hard wire or by means of conventional wireless digital data transceivers. The information is coupled wirelessly by means of the TTE transceivers loop antennas to the mine surface. Control may be exercised by transmitting control commands from the surface into the mine. A situation may arise where a sensor is located at a remote section of the mine that is difficult to access on a daily or on a continuous basis. A TTE transceiver may be installed near the sensor and data may be transmitted directly through the overburden to a TTE transceiver located on the surface of the mine above the transceiver inside the mine.

The transmission of digital data is accomplished using frequency shift keying ("FSK") or phase shift keying ("PSK") or other methods known to persons skilled in the art. Using FSK coding, a logic "1" may be represented by a 6200 Hz sine wave, and a logic "0" by a 4500 Hz sine wave. Alternatively, square waves may be transmitted. These signals are amplified and fed to a loop antenna. The digital transceiver may be separate from the voice transceiver or they may be combined into a single system. In the latter case, components, such as amplifiers, including the power amplifier, and the antennas may be shared. At the receiving end, signal waves representing the logic "1"s or "0"s are recovered. In one embodiment, the signal waves are detected synchronously. Passive band-pass filtering, active filtering, median filtering and tracking comb filtering may also be used. The signals may be reconstructed into square waves by means of well known zero crossing techniques because knowledge of frequencies or phase, and not magnitudes, of the signal are of interest. Other methods to detect "1"s and "0"s may include neural networks or wavelet theory. Use of these methods to classify signals into groups ("1"s and "0"s in this case is well known to those skilled in the art.

Figure 16:
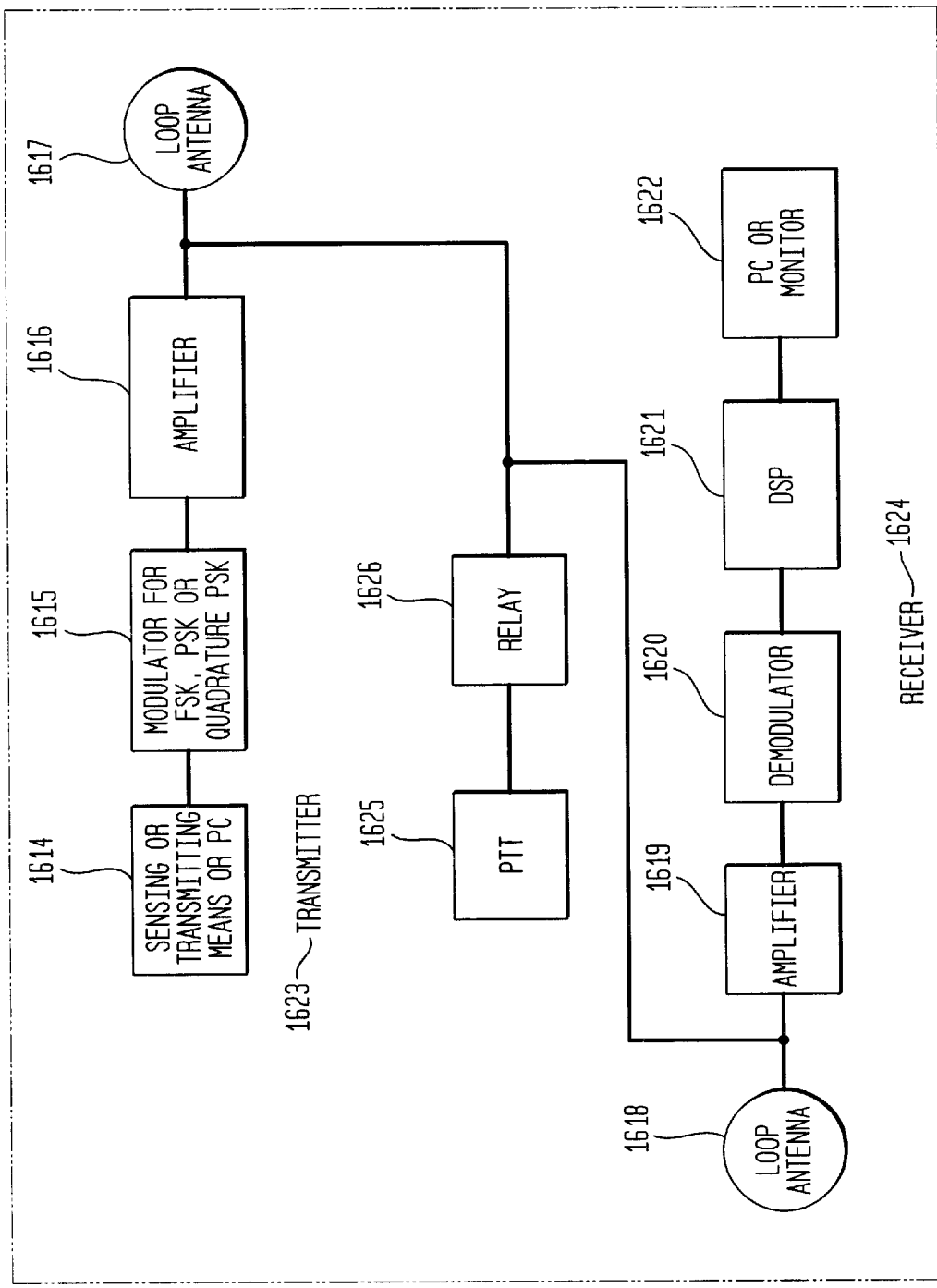
FIG. 16 illustrates one embodiment of the invention for through-the-earth ("TTE") data communication.

FIG. 16 illustrates a digital through-the-earth ("TTE") communication system in one embodiment of the present invention. To transmit data at transmitting end 1623, the data from a sensor, transducer, or PC 1614 is frequency shift keying ("FSK") modulated in a modulator 1615. The modulation may be a phase shift modulation or quadrature phase modulation. The output signal from modulator 1615 is amplified in amplifier 1616 and transmitted through loop antenna 1617.

At receiving end 1624, the signal is coupled to loop antenna 1618, amplified, and filtered in amplifier/filter 1619. The signal is then demodulated in demodulator 1620. The signal leaving demodulator 1620 enters digital signal processor ("DSP") 1621. In one embodiment, DSP 1621 is programmed to perform extensive filtering. The performance may include the functions of lock-in amplifier, digital filtering and moving window averaging. The output from DSP 1621 is input into computer 1622 for display and information processing or into other display means. The signal input into modulator 1615 may be digital or analog. If the input is analog, the modulator 1615 includes an A/D converter to convert the signal to digital format.

At each station the same antenna may be used for both signal transmission and signal reception. When Push-to-talk switch 1625 is activated, a relay 1626 connects the antenna to the transmitter output terminals. When push-to-talk 1625 is released, the antenna is connected to the receiver input terminals.

Powerline Voice/Data Communications Network

At each location, the RF transceivers in the present invention may be connected to a powerline communication module. The powerline communication module of the present invention provides power to the transceivers and also enables bi-directional communication of audio/voice, control and status information between the module and one or more transceivers. The powerline communications module includes capability to drive each RF transceiver to transmit an audio signal so that anyone within range of the transceiver may receive and hear the audio message, via portable hand-held radio, for example. Similarly, when anyone within range of a RF transceiver desires to communicate with another individual, they simply talk into their portable hand-held radio and the nearest RF transceiver receives the broadcast and informs the powerline communications module that is receiving a valid RF broadcast. The RF transceiver may also send the demodulated voice signal to the communications module. In cases where the transmission/reception ranges of the RF transceivers overlap, such that several powerline communications modules may receive the same RF signal through their corresponding RF transceivers, the communications modules have the ability to determine the strength of the received signal at the RF transceiver. In this way, only the communications module which is receiving the strongest signal may send the received signal to other powerline communications modules on network.

To enable facility-wide communications to occur, an audio signal received by a RF transceiver connected to a control module is converted from an analog signal to a digital representation of the signal and sent over the network connections to the other control modules connected to the network. To provide multiple channels of voice communications using a bandwidth-limited powerline interface modem, a significant amount of signal processing is performed on the speech signal to reduce the number of bits required to represent the speech waveform. To code and/or decode speech signals, an off-the-shelf speech coding integrated circuit may be used. Alternatively, a software algorithm may be implemented to perform the coding and/or decoding of the speech signals.

When the other powerline communications modules receive the coded speech waveform over the network, the powerline communications modules convert the signal back to an analog speech waveform, e.g., by using a speech coding integrated circuit or a software-implemented algorithm. In addition, the powerline communications modules drive the corresponding RF transceivers to transmit the signal so that anyone located within range of the transceiver is enabled to hear the message, e.g., via a hand-held radio. The present invention provides multiple independent channels of communication which may be used to transmit additional information such as the coded speech signal indicating the channel to which the speech corresponds. Further, other information-may be transmitted with the digitized speech waveform.

The powerline communications modules also may include electronic devices such as portable computers, sensors, or automated equipment connected to one or more control modules. The connection may be accomplished using the standard RS-232 data communications protocol so that, e.g., the digital process information may be monitored and/or controlled remotely from within the site. In one embodiment, the present invention includes a RS-232 connection to each control module.

In one embodiment, the present invention includes a novel method of connections between multiple power systems or phases. Traditionally, when two separate power systems or phases are used within a facility, they are connected together using a capacitor bridge (FIG. 20) to provide network communications between both power systems or phases. However, this only reliably works between two power systems or phases. Using more than one capacitor bridge in a system, for example, to connect more than two power systems to the same powerline communications network does not work with the traditional systems. To overcome the shortcomings of the traditional systems, the present invention includes a novel bridging method and a novel capacitive bridge method.

The novel bridging method leaves two power systems or phases that are being bridged as independent and galvanically-isolated with only a galvanically-isolated RS-232 serial connection between the two power systems or phases. In this way, network data, e.g., digitized voice and digital process data, may be passed between two powerline communications modules, one on each power system or phase, thereby effectively bypassing the AC powerline medium and instead using a dedicated, galvanically-isolated high-speed serial connection so that the two power systems or phases are left isolated. Thus, the connection enables communications between a powerline communications module powered using the second power system or phase and a powerline communications module which has power supplied by the third power system or phase. The connection further enables all powerline communications modules powered by the third power system or phase to communicate with each other using the AC powerlines of the third power system or phase and with those powerline communications modules powered by the first and second power systems or phases by using the dedicated galvanically isolated high-speed serial connection. This galvanically-isolated serial communication link between the second and third power systems or phases is bi-directional so that communication from the first or second power system or phase, to the third power system or phase is accomplished by the powerline communications module on the second power system or phases sending digital information which has been sent from one or more other powerline communications modules powered by either the first or second power system or phase over the galvanically-isolated serial connection to the powerline communications module on the third power system or phase so that information may be received by all powerline communications modules powered on the third power system or phase. Additional power system or phases may be bridged, for example, by alternately using capacitor bridges and galvanically-isolated serial bridging method. For instance, if a fourth power system or phases need to be included in the communications network, a capacitor bridge may be used to bridge the third and fourth power systems or phases. This configuration is possible because the capacitor bridge between the first and second power systems or phases is galvanically-isolated from the new capacitor bridge between the third and fourth power systems or phases, thereby effectively eliminating the problems which occur when two capacitor bridges are used together without galvanic isolation. Continuing with the example, if a fifth power system or phase need to be included in the communications network, the galvanically-isolated serial bridging method of the present invention may be used to bridge the fifth power system or phase with the fourth power system or phase.

One or more control modules of the present invention may include one or more status indicators, e.g., LEDs, which may be used to quickly identify any network-related errors that may occur over the connection between the control modules. The status indicators may be also used for troubleshooting other problems during installation and maintenance of the system. For example, the status indicators may be used to determine such problems as the existence and location of broken network connections and noise-induced communications errors. LEDs may also be used to indicate the status of each communications channel.

Figure 17:
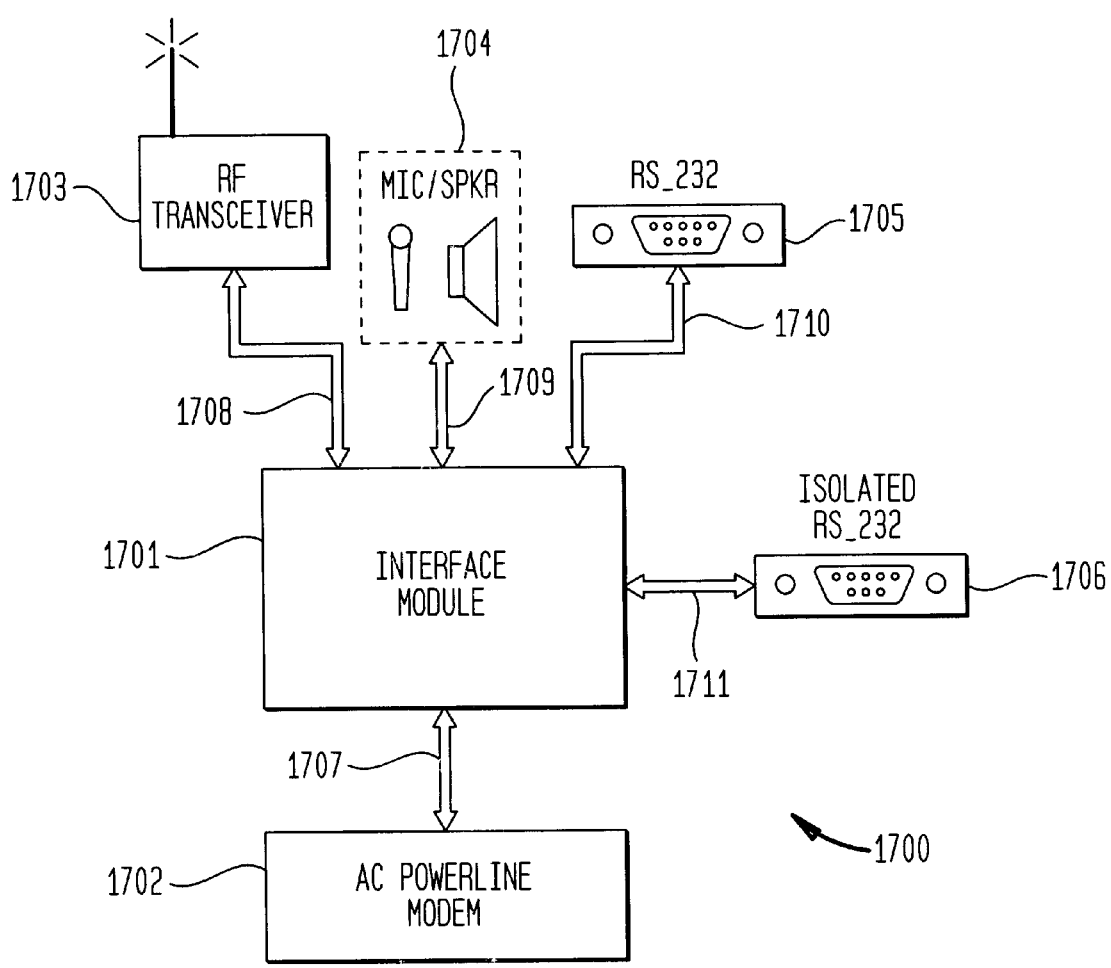
FIG. 17 illustrates a typical implementation of a powerline communications module showing connections between individual blocks.

FIG. 17 illustrates a typical implementation of a powerline communications module showing connections between individual blocks. The powerline communications module 1700 includes an interface module 1701 comprising a digital signal processor ("DSP"), logic, and active electronics for processing the audio signals and external control signals. The interface module 1701 is connected to an AC powerline modem 1702 through connections 1707. The connection 1707 may be standard RS-232 serial communications. The AC powerline modem 1702 modulates and demodulates digital data for transmission and reception over the AC powerline.

In one embodiment, the interface module 1701 provides connections for up to four external RF transceivers 1703. The RF transceivers 1703 may be used to receive and transmit any audio signals to hand held modules within range of the RF transceiver 1703. Each transceiver 1703 connected to the same interface module 1701 may be tuned to a different radio frequency. Wires 1708 provide the connection between the RF transceiver 1703 and the interface module 1701.

Similar to the facility-wide system described herein above, the powerline communications system of the present invention may include one or more antennas to receive and transmit signals. In one embodiment, separate antennas, one for receiving signals and another one for transmitting signals, may be used. For example, a signal received at the receiving antenna may be transmitted by the transmitting antenna as the receiving antenna receives the signal. Further, the receiving antenna may receive a signal at the same time the transmitting antenna is transmitting. In another embodiment, one antenna may function to receive and transmit signals.

The present invention also provides a microphone and speaker combination 1704 to be used for voice input and output so that the powerline communication module may be used in a desktop application. The microphone and speaker 1704 are connected to the interface module 1701 using one or more conductors 1709. An RS-232 connector 1705 is also provided to interface the powerline communications module to a data device or portable computer. Having such a connection, for example, enables various production machinery which has an RS-232 port to be monitored or controlled remotely within the facility. Conductors 1710 provide the connections between the interface module 1701 and the RS-232 ports 1705. Additionally, a galvanically-isolated RS-232 serial port 1706 may be connected to the interface module 1701 using wires 1711. This serial port is provided to enable bridging the communications network between two isolated power distribution systems or phases.

Figure 18:
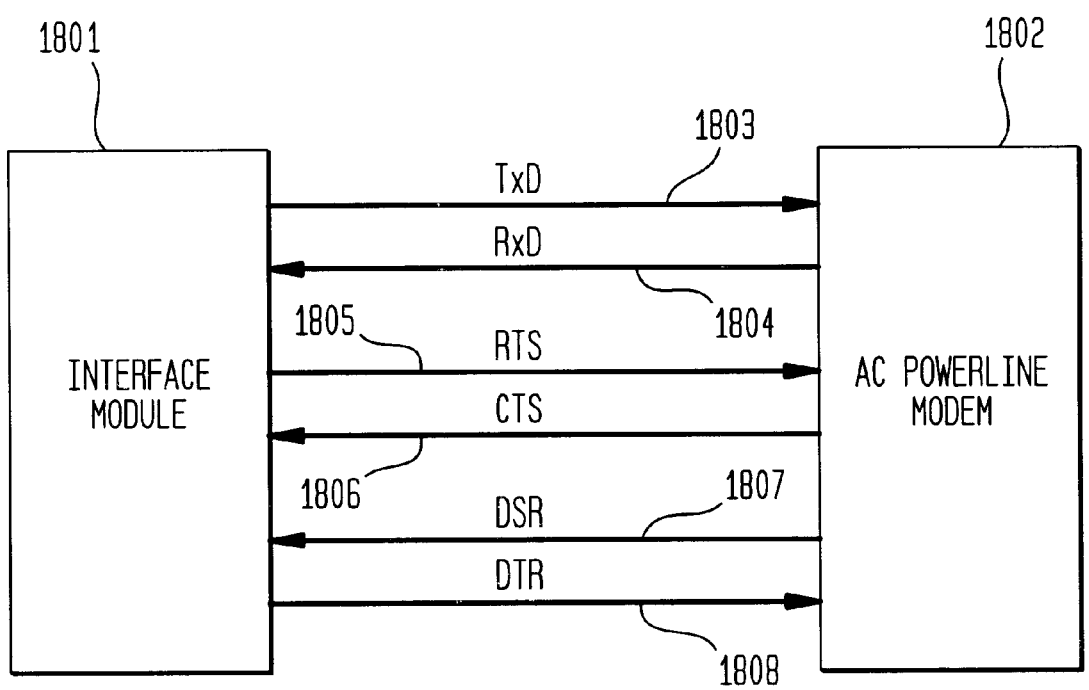
FIG. 18 illustrates the RS-232 serial connections between the powerline interface module and the AC powerline modem in one embodiment of the present invention.

FIG. 18 illustrates the standard RS-232 signals which are used for communication between the interface module 1801 and the AC powerline modem 1802. The signal TxD 1803 is used to transmit serial data from the interface module 1801 to the AC powerline modem 1802. The RxD 1804 line carries the serial data which is transmitted from the AC powerline modem 1802 and received by the interface module 1801. The RTS 1805 and CTS 1806 lines are used for handshaking between the interface module 1801 and the AC powerline modem 1802. When the interface module 1801 desires to transmit data to the AC powerline modem 1802, the interface module 1801 signals a request-to-send by asserting the RTS signal 1805. The AC powerline modem 1802 when ready to receive data, acknowledges the request-to-send by asserting the clear-to-send signal, CTS 1806. Similarly, when the AC powerline modem 1802 has data ready to transmit to the interface module 1801, the data-set-ready line, DSR 1807, is asserted. The interface module 1801 asserts the data-terminal-ready, DTR 1808, in response to the DSR 1807 signal when it is ready to receive data from the AC powerline modem. Table 1 describes the RS-232 signals used in the present invention.

TABLE 1

| Signal | Description |
| --- | --- |
| TxD | data sent from interface unit to AC powerline modem |
| RxD | data sent from AC powerline modem to interface unit |
| RTS | handshaking signal; notifies AC powerline modem that data is available for transmission from interface unit |
| CTS | handshaking signal; asserted in response to RTS to signal that AC powerline modem is able to receive data from interface unit |
| DSR | handshaking signal; asserted when AC powerline modem has data available and ready to send to interface unit |
| DTR | handshaking signal; asserted in response to DSR to signal to AC powerline modem that the interface unit is prepared to receive data from AC powerline modem |

Figure 19:
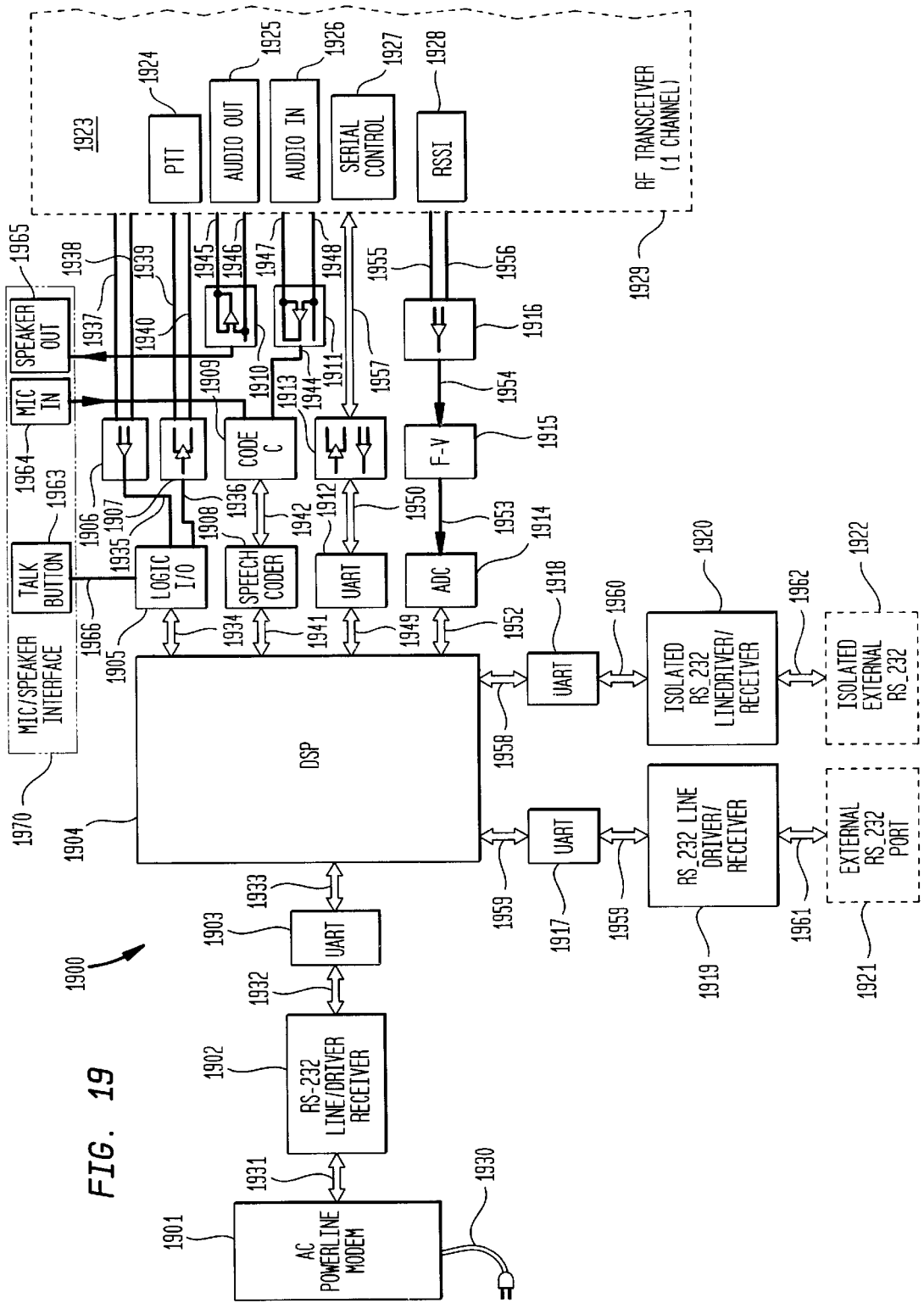
FIG. 19 illustrates the internal processing blocks of the powerline interface module of the present invention in one embodiment.

FIG. 19 illustrates an internal block diagram 1900 showing a configuration of the powerline communications module in one embodiment of the present invention. The digital signal processor ("DSP") 1904 controls the functions of the powerline communications module. The powerline communications module may include one or more, e.g., four RF transceivers. FIG. 19 illustrates one RF transceiver 1929. Voice signals that are transmitted by the RF transceiver 1929 are generated by sending coded voice data over connections 1941 to the speech coder/decoder circuit 1908. The speech coder/decoder circuit 1908 is used to efficiently represent the speech samples. The speech coder 1908 communicates over lines 1842 with CODEC 1909. The CODEC 1909 translates the decoded speech output from speech coder 1908 into an analog voice waveform 1943. The analog voice wave form 1943 is converted to a balanced audio signal for noise immunity by the balanced line driver 1910. The outputs of the balanced line driver are sent to the RF transceiver 1929 over conductors 1945, 1946 and received at the RF transceiver as the Audio Out signal 1925. When the powerline communications module desires to drive the RF transceiver 1929 to transmit the Audio Out signal 1925, the DSP 1904 asserts a logic-level signal, push-to-talk ("PTT") 1936. The PTT 1936 is accessed through the input/output logic 1905 over conductors 1934. To reduce the effects of noise on signal transmission, the PTT signal 1936 is applied to differential line driver 1907 to generate the differential signals 1939, 1940 which are received at the RF transceiver and converted back to a logic-level PTT signal 1924.

Voice signals that are received by the RF transceiver, Audio In 1926, are sent differentially over conductors 1947, 1948 to the powerline communications module where they are received by a balanced line receiver 1911 and converted to the single-ended analog signal 1944 which is digitally sampled by CODEC 1909. The output of the CODEC 1909 is applied to speech coder/decoder circuit 1908 using conductors 1942. The coder/decoder circuit 1908 efficiently codes the digital samples provided by CODEC 1909. The coded voice signal is available to the DSP 1904 over wires 1941 for transmission to other powerline communications modules located on the network. When the RF transceiver 1929 receives RF Carrier, the Radio Frequency Carrier Detect ("RFCD"), 1923 logic-level signal is asserted. This signal informs the powerline communications module that a voice signal is present in the Audio In 1926 line. The RFCD 1923 signal is sent differentially over conductors 1937, 1938 to differential line receiver 1906 which converts the signal back to a single-ended logic signal 1935. The signal is applied to input/output logic 1905 and monitored by the DSP using conductors 1934.

As described herein above, the powerline communications module of the present invention may include a microphone/speaker 1970. In one embodiment, an interface between the powerline communications module and the microphone/speaker is provided by connections that tap into the equivalent single-ended signals interfacing the RF transceiver. The microphone input signal 1964 is connected to the CODEC 1909 analog input line 1944. The speaker output signal 1965 is connected to the CODEC 1909 analog output line 1943. The microphone/speaker 1966 in the present invention may also include a talk switch 1963 which may be pressed when a user desires to talk using the microphone 1970. A signal indicating that the talk switch 1963 was pressed is applied to logic I/O 1905 through wire 1966. The DSP 1904 may monitor the status of the talk switch 1963 and differentiate between the RFCD 1923 status and the talk switch status. When either the RFCD 1923 signal or the talk switch 1963 signal is detected, the DSP 1904 begins transmitting the coded audio input signal to other powerline communications modules using the AC powerline modem 1901.

The powerline communications module in the present invention may also include a serial communications link 1951 with the RF transceiver 1929 so that the RF transceiver 1929 may be remotely configured and monitored from the powerline communications module. For noise immunity, the connections are differential and provide Transmit Data ("TxD"), Receive Data ("RxD"), and Serial Clock ("SCLK") signals for communications between the RF transceiver 1929 and powerline communications module. Serial handshaking signals need not be used between the RF transceiver and powerline communications module. The communication signals are converted between single-ended and differential by differential line driver/receiver 1913 and sent to UART 1921 over conductors 1950. The DSP accesses the data from UART 1912 over conductors 1949.

In the present invention, the RF transceiver 1929 may also communicate the strength of the received RF signal, i.e., the Received Signal Strength ("RSS") signal 1928, to the powerline communications module. At the RF transceiver 1929, the RSS signal 1928 comprises a logic-level signal which has a frequency proportional to the strength of the received RF signal. This signal is sent differentially over conductors 1955, 1956 to the powerline communications module. A differential line receiver 1916 of the powerline communications module converts the RSS signal back to a single-ended logic level signal 1954 and applies the signal 1954 to frequency-to-voltage converter 1915. The frequency-to-voltage converter 1915 converts the signal 1954 to an analog voltage 1953. The analog voltage 1953 is proportional to the frequency of the single-ended logic level signal 1954. The analog voltage is sampled by analog-to-digital converter 1914 and provided to the DSP 1904 through conductors 1952. Thus, the strength of each signal received by the powerline communications module may be monitored so that when several RF transceivers receive RF signals at the same time, the signal having the strongest strength is transmitted to other powerline communications modules on the network.

Further, DSP 1904 may access UART 1917 using conductors 1957. The serial output 1959 of UART 1917 is sent to RS-232 line driver/receiver 1919 connected to an external RS-232 connector 1921 using wires 1961. In this way, the powerline communications module may communicate with a PC or data device such that operations within the facility may be monitored or controlled remotely using the powerline network.

The present invention may also include a galvanically-isolated RS-232 connector 1922 to enable bridging of powerline communications modules between multiple power systems or phases when a simple capacitor bridge does not work. A simple capacitor bridge would not work, e.g., when at least one capacitor bridge is already being used in the system. In one embodiment, access to the galvanically-isolated RS-232 connector 1922 is provided by the conductors 1958 which allow communications between the DSP 1904 and UART 1918. The serial output of the UART 1918 is applied to isolated RS-232 line driver/receiver 1920 using wires 1960. The isolated RS-232 line driver/receiver 1920 is connected to the isolated external RS-232 port using wires 1962.

As shown in FIG. 19, the DSP 1904 is also connected to the AC powerline modem 1901. In one embodiment of the present invention, communications with the AC powerline modem 1901 and the DSP 1904 are performed serially. To provide the serial communications functionality, the DSP 1904 is connected to UART 1903 using conductors 1933. The serial input and output from UART 1903 is sent to RS-232 line driver/receiver 1902 which provides RS-232 voltage levels on conductors 1931 for communication with the AC powerline modem 1901. The AC powerline modem communicates with other AC powerline modems using an AC power cord 1930. The AC powerline modem may also communicate with other powerline communications modules directly.

Figure 20:
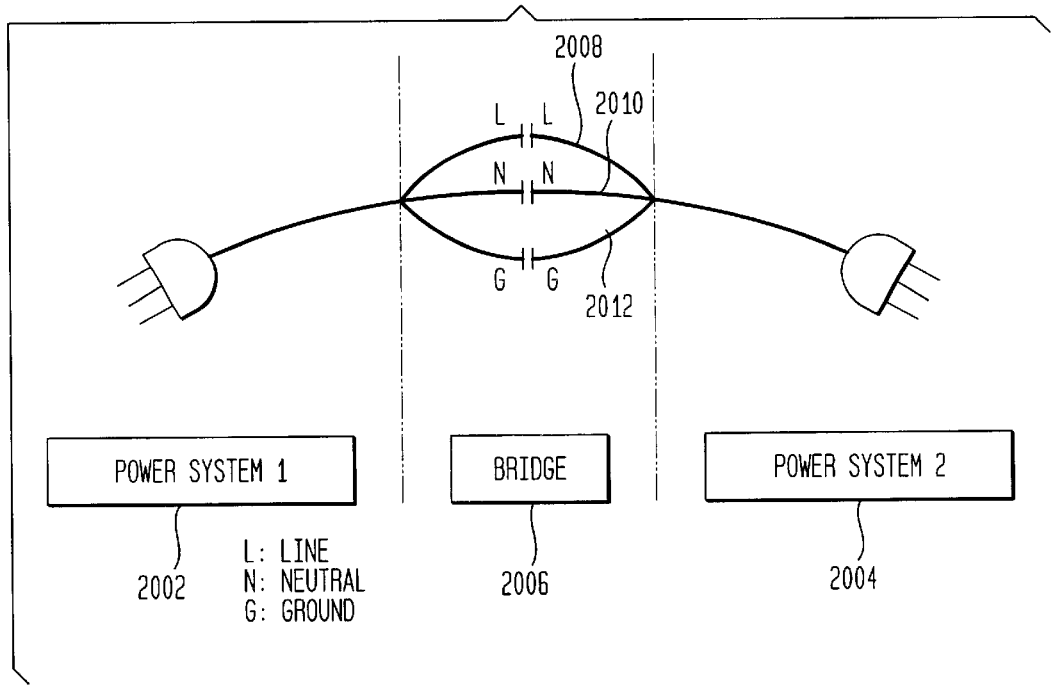
FIG. 20 illustrates a capacitive coupling bridge.

FIG. 20 illustrates a capacitive coupling bridge. The two power systems, power system 1 2002 and power system 2 2004 are coupled with a bridge 2006. As shown, the bridge includes the powerline which is split into a line 2008, neutral 2010, and ground 2012.

Figure 21:
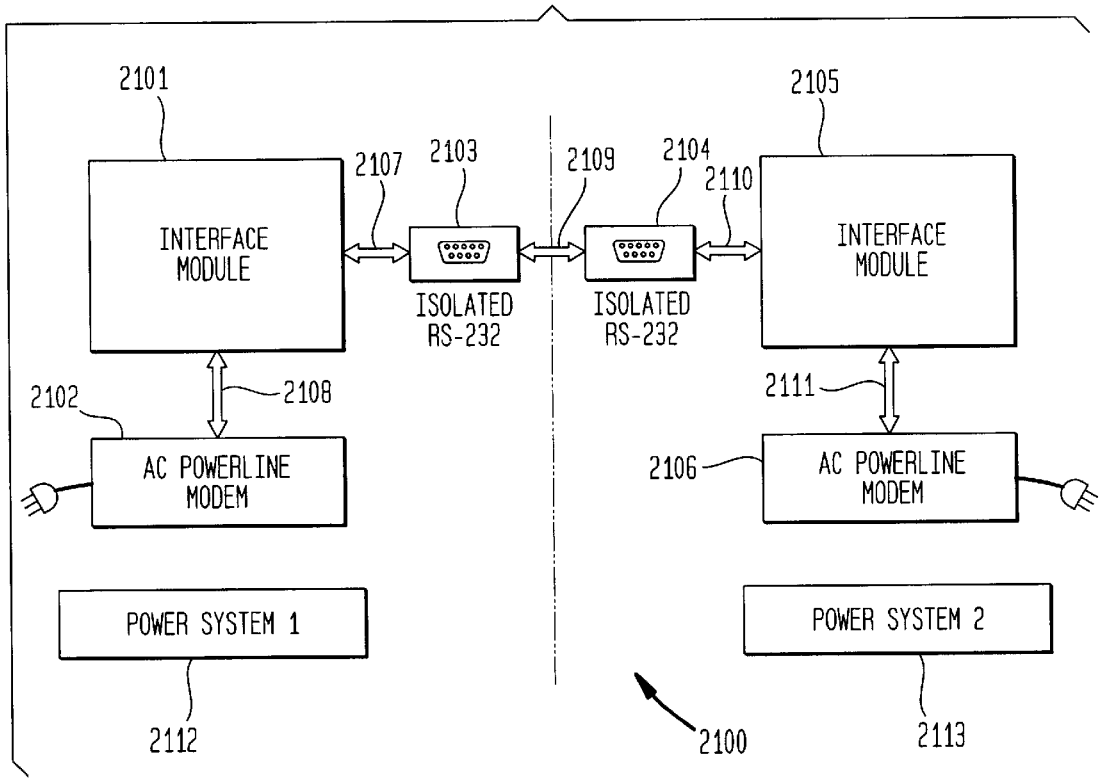
FIG. 21 illustrates a galvanically-isolated power system coupling bridge of the present invention, bridging between two separate power systems or phases.

FIG. 21 illustrates a galvanically-isolated power system coupling bridge of the present invention, bridging between two separate power systems or phases. The interface module of power system 1 2101 is connected to the first power system or phase by AC powerline modem 2102 through connections 2108. The interface module 2101 also has a connection to the galvanically-isolated serial port 2103 using, for example, wires 2107. The interface module of power system 2 2105 is connected to the second power system or phase by AC powerline modem 2106, for example, by using wires 2111. The powerline interface module of 2105 of the second power system is connected to a galvanically-isolated serial port 2104, for example, using wires 2110. Since the serial ports 2103, 2104 are galvanically-isolated, bi-directional communication is achieved between powerline interface modules 2101, 2105 of the two powerline systems using the galvanically-isolated connection 2109. Thus, communications between powerline control modules powered by different power systems or phases are accomplished without disturbing the isolation between the two power systems or phases.

While the invention has been particularly shown and described with respect to a preferred embodiment thereof, it will be understood by those skilled in the art that the foregoing and other changes in form and details may be made therein without departing from the spirit and scope of the invention.

What is claimed is:

1. A facility-wide communication system for communicating in an energy-limited environment, comprising:

a plurality of RF transceivers, each of the plurality of RF transceivers located within a communication range of an area where communication is desired and connected to a control unit;

a plurality of control units, each of the plurality of control units connected with wire to at least another one of the plurality of control units, the control units connected to at least one of the plurality of RF transceivers and providing power to the transceivers, wherein a wireless communication signal received at first one of the plurality of RF transceivers is transmitted with a logic pulse to a first one of the plurality of control units connecting the first RF transceiver, and the first control unit transmits the communication signal and the logic pulse to next one of the plurality of control units that the first control unit is directly connected to, the next control unit further transmitting the communication signal and logic pulse to a second one of the plurality of RF transceivers connected to the next control unit, the logic pulse causing the second RF transceiver to transmit the communication signal wirelessly, the next control unit further transmitting the communication signal with the logic pulse to another one of the plurality of control units that is connected to the next control unit, thus allowing the communication signal to be propagated to a desired destination in an energy-limited areas via the RF transceivers communicating wirelessly and the control units communicating via wire connections.

2. The facility-wide communication system as claimed in claim 1, wherein at least one of the plurality of the control units include:

a signal processor;

one or more interface connector ports operable to connect to a radio transceiver and to another one of the one or more control modules; and a plurality of signal lines connected from the signal processor to the one or more interface connector ports, wherein signal can be received via the one or more interface connector ports and retransmitted via the one or more interface connector ports to and from the radio transceiver and the another one of the one or more control modules, the radio transceiver being operable to receive and transmit wireless signals in an energy-limited environment.

3. The facility-wide communication system as claimed in claim 1, wherein at least one of the plurality of RF transceivers is connected to the one or more interface connector ports; and the system further includes a serial communication port providing a connection to another one of the plurality of control unit, wherein signal with limited electromagnetic energy within a range of the RF transceiver can be received at the radio transceiver and transmitted via the serial communication port to the another one of the plurality of control units, and signals with limited electromagnetic energy outside a range of the RF radio transceiver can be received from the another one of the plurality of control units via the serial communicate signals with limited electromagnetic energy to a desired area.

4. The facility-wide communication system as claimed in claim 3, wherein the RF transceiver includes a radio frequency transceiver tuned within a UHF frequency band.

5. The facility-wide communication system as claimed in claim 3, wherein each of the plurality of transceivers are enabled to be tuned to a different radio frequency channel from the rest of the plurality of transceivers, wherein the plurality of transceivers can receive signals of multiple frequencies.

6. The facility-wide communication system as claimed in claim 3, wherein the plurality of control units are connected to the another one of the plurality of control units via the serial communication port using a twisted-pair cable.

7. The facility-wide communication system as claimed in claim 3, wherein the plurality of signal lines include:
a signal line to receive a signal representing an intensity of a received radio signal, and if more than one of same signals are received by the signal processor, a signal with the strongest intensity is selected for processing.

8. The facility-wide communication system as claimed in claim 3, wherein the serial communication port includes:
an out-port adapted to receive a connection to an in-port of the another one of the plurality of control units;
an in-port adapted to receive a connection to an out-port of the another one of the plurality of control units.

9. The facility-wide communication system as claimed in claim 3, wherein the out-port includes a buffered connection to the in-port.

10. The facility-wide communication system as claimed in claim 3, wherein the transceiver further includes an antenna to receive and transmit signals.

11. The facility-wide communication system as claimed in claim 3, wherein the transceiver further includes:
a receiving antenna to receive signals; and
a transmitting antenna to transmit signals.

12. The facility-wide communication system as claimed in claim 1, the one or more interface connector ports further including:
a second serial communication port connecting to the RF transceiver,
wherein the signals can be received and sent to the RF transceiver via the second serial communication port.

13. The facility-wide communication system as claimed in claim 1, the one or more interface connector ports further including:
a third serial communication port connecting to one or more peripheral devices,
wherein the signals transmitted and received by the signal processor can be monitored at the peripheral devices via the third serial communication port.

14. The facility-wide communication system as claimed in claim 13, wherein the one or more peripheral devices are connected using a RS-232 data communications protocol.

15. The facility-wide communication system as claimed in claim 13, wherein the one or more peripheral devices include one of portable computer, sensor, automated equipment.

16. The facility-wide communication system as claimed in claim 1, wherein the signals include radio frequency signals.

17. The facility-wide communication system as claimed in claim 1, wherein the signals include analog voice signals.

18. The facility-wide communication system as claimed in claim 1, wherein the signals include digital signals.

19. The facility-wide communication system as claimed in claim 1, wherein at least one of the one or more interfaces includes through-the-earth transceiver interface.

20. A facility-wide communication system, comprising:
a plurality of wireless transceivers, each one of the plurality of wireless transceivers located within radio communication range of a wireless communication device;
a first signal processor connected to a first one of the plurality of wireless transceivers enabled to communicate signals to and from the first one of the plurality of wireless transceivers, the first signal processor having a first buffer for storing the signals;
a second signal processor connected to a second one of the plurality of wireless transceivers enabled to communicate signals to and from the second one of the plurality of wireless transceivers, the second signal processor also connected to the first signal processor enabled to communicate signals to and from the first signal processor, the second signal processor having a second buffer for storing the signals,
a third signal processor connected to a third one of the plurality of wireless transceivers enabled to communicate signals to and from the third one of the plurality of wireless transceivers, the third signal processor connected to the second signal processor, the third signal processor having a third buffer for storing the signals,
wherein signals with limited electromagnetic energy received at the first one of the plurality of wireless transceivers are communicated to the first signal processor and transmitted to the second signal processor for transmitting wirelessly at the second one of the plurality of wireless transceivers, and the second signal processor further transmitting the signals to the third signal processor for transmitting wirelessly at the third one of the plurality of wireless transceivers, allowing signals with limited electromagnetic energy to be communicated in a range of areas beyond its electromagnetic energy range.

21. A method for communicating in an energy-restricted environment,
receiving energy-limited wireless signals at a transceiver;
converting the energy-limited wireless signals into digital signals at a first signal processor connected to the transceiver;
transmitting the digital signals with a logic pulse to another signal processor connected to the first signal processor;
converting the digital signal to wireless signals at the another signal processor; and
transmitting the wireless signals with the logic pulse to a second transceiver connected to the another signal processor, the logic pulse causing the wireless signals to be broadcast by the second transceiver in the area where the second transceiver is located, the another signal processor further transmitting the digital signal to a next signal processor connected to the another signal processor, wherein the next signal processor can communicate the energy-limited wireless signals via one or more third transceivers connected to the next signal processor.

* * * * *